United States Patent [19]

Yashima et al.

[11] Patent Number: 5,432,770
[45] Date of Patent: Jul. 11, 1995

[54] OPTICAL RECORDING MEDIUM, METHOD OF REPRODUCING RECORDED DATA OF OPTICAL RECORDING MEDIUM, AND SYSTEM FOR REPRODUCING RECORDED DATA OF OPTICAL RECORDING MEDIUM

[75] Inventors: Masataka Yashima; Yukitoshi Ohkubo, both of Yokohama; Hiroyuki Sugata, Yamato, all of Japan

[73] Assignee: Canon Kabushiki Kaisha, Tokyo, Japan

[21] Appl. No.: 215,675

[22] Filed: Mar. 22, 1994

Related U.S. Application Data

[63] Continuation of Ser. No. 832,729, Feb. 7, 1992, abandoned.

[30] Foreign Application Priority Data

Feb. 8, 1991 [JP] Japan ................... 3-017639
Mar. 27, 1991 [JP] Japan ................... 3-063198

[51] Int. Cl.⁶ ............................................ G11B 7/00
[52] U.S. Cl. ................................. 369/100; 369/275.1; 369/272; 369/284
[58] Field of Search ............... 369/54, 58, 50, 275.1, 369/275.2, 275.5, 280, 283, 286, 288, 100, 272

[56] References Cited

U.S. PATENT DOCUMENTS

| | | | |
|---|---|---|---|
| 4,189,735 | 2/1980 | Bell et al. | 346/135.1 |
| 4,635,245 | 1/1987 | Smith | 369/283 |
| 4,807,220 | 2/1989 | Miyai et al. | 369/283 |
| 4,839,883 | 6/1989 | Nagata et al. | 369/283 |
| 4,871,601 | 10/1989 | Miura et al. | 427/64 |
| 5,093,174 | 3/1992 | Suzuki et al. | 369/286 |
| 5,108,873 | 4/1992 | Fukui et al. | 430/270 |
| 5,109,375 | 4/1992 | Greidanus et al. | 369/283 |

FOREIGN PATENT DOCUMENTS

| | | |
|---|---|---|
| 0259151 | 3/1980 | European Pat. Off. |
| 0280531 | 8/1988 | European Pat. Off. |
| 0301537 | 2/1989 | European Pat. Off. |
| 2575578 | 7/1986 | France |
| 2646546 | 11/1990 | France |
| 54-126005 | 9/1979 | Japan |

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

An optical recording medium has a substrate and, provided thereon, a recording layer, a recording auxiliary layer that covers a given region on the surface of the recording layer on its side not facing the substrate, and a recording restraining layer that the covers the recording layer on its surface not covered with the recording auxiliary layer.

18 Claims, 10 Drawing Sheets

OPTICAL RECORDING MEDIUM, METHOD OF REPRODUCING RECORDED DATA OF OPTICAL RECORDING MEDIUM, AND SYSTEM FOR REPRODUCING RECORDED DATA OF OPTICAL RECORDING MEDIUM

This application is a continuation of application Ser. No. 07/832,729 filed on Feb. 7, 1992, now abandoned.

BACKGROUND OF THE INVENTION

1. Field of the Invention

The present invention relates to an optical recording medium that optically records and reproduces information by the action of light, in particular, laser light such as semiconductor laser light. More particularly, it relates to a cardlike information recording medium (hereinafter "optical card") handy to carry.

2. Related Background Art

Recent years, as the society is progressively informationized, various information recording carriers or mediums and optical information recording and reproducing apparatus for optically recording and reproducing information, including optical discs, optical cards and optical tapes, have been proposed as a means for dealing with a great variety of information in a high speed and high efficiency. These information recording mediums include those which can detect information by converting the binary-coded information to a change in strength of reflected light which accompanies the presence or absence of pits.

As a recording medium that relies on changes in optical reflectance, what is called a heat mode recording medium, in which recording is carried out by irradiating a recording layer with an energy beam such as a laser beam in the form of a spot and changing in part the state of the recording layer. Recording mediums of this type do not require any development processing or the like after writing of information, and are called DRAW (direct read after write) media that can "read immediately after writing", by which high density recording can be performed and additional writing can be also performed.

Among such optical recording mediums, research recent years has been geared towards the productions of optical cards that are very handy to carry, that can hold recorded information in a large volume, and that also have a higher security than magnetic cards.

In optical information recording-reproducing apparatus, there is a system in which tracking tracks such as grooves or light-screening areas are previously formed at given intervals on the surface of a substrate of the medium for the purpose of tracking servo for writing and reading.

In this system, the tracking tracks play a role as a guide of a recording laser beam and/or a reproducing laser beam, and hence the laser beam can trace the information recording tracks with improved accuracy and also it is possible to achieve a higher access than conventional optical recording mediums that make use of a substrate having no tracking tracks.

FIG. 3 is a diagrammatical plan view showing a recording format of a conventional optical card. In FIG. 3, an optical card 11 is provided thereon with an information recording track 33 arranged in plurality. The respective information recording tracks are separated from one another through tracking tracks 32 for the tracking servo of reproducing light or recording light.

The optical card 11 is also provided thereon with a recording region 34 having the information recording track in plurality, and the information is formed by the action of recording light in the form of pits 31 on the information recording tracks within this region. An arrow A indicates the directions in which the optical card 11 moves at the time of recording and reproducing operations.

FIG. 4 is a schematical view showing the constitution of a recording-reproducing apparatus for an optical card.

In FIG. 4, the optical card 11 is movable by means of a rotating mechanism 46 in the directions of an arrow A which are in parallel to track grooves 2 with respect to recording and/or reproducing beams 47. As for light from a light source 45 such as a semiconductor laser provided in an optical head 41, it is converged through a lens system 42 and shed on the information recording track 33 of the optical card. Thus, the recording light causes an optically detectable change on a recording layer 3 of the information recording track. The reproducing light reflects from the recording layer 3, again passes through the lens system 42, is separated from the light emitted from the light source by means of a beam splitter 43, and enters a photodetector 44, where an electrical signal corresponding with the recorded information is outputted. Once the reproduction of the information recorded in the information recording track 33 is completed as a result of the relative movement of the optical card 11 with respect to the reproducing beam, the optical head 41 moves in the direction (not shown) perpendicular to the tracks of the optical card and also performs tracking servo to detect an other information recording track 33. Subsequently, this optical card is driven in the reverse direction and thus the information is reproduced in the same way.

Incidentally, conventional optical cards are prepared, as shown in FIGS. 2A and 2B, by forming a recording layer 3 on the substrate surface that embraces a track groove forming region of a transparent substrate 5 having a track groove 2 serving as a tracking track, and laminating thereto a protective substrate 1 via an adhesive layer 4.

Information is recorded or reproduced by irradiation with a laser beam through the transparent substrate 5. Tracking by the laser beam is carried out by utilizing a difference in phase or amplitude of the light reflected from the track groove 2 corresponding to a tracking track and the information recording track area.

The recording light used in the recording of information on such an optical card is so selected as to be of such an intensity that, when it is shed on the recording layer 3 of the optical card, the recording layer undergoes reaction with the light to form the optically detectable changes (pits). As for the reproducing light, a laser beam is used which has an intensity weakened to such an extent that no changes occur in the recording layer 3 when the beam is shed on the recording layer 3.

Any conventional optical cards have a recording layer provided with an adhesive layer in close contact and hence the recording layer is restrained from the change in state caused by the recording light, so that they have a low recording sensitivity. Accordingly, in the process of recording on such optical cards, it has been required to use a laser beam with a high intensity or to lower the recording speed on the optical cards.

As for the instance in which the information recorded in an optical card is reproduced, it is preferable to increase the intensity of the reproducing light so that the S/N ratio of the signal can be improved, as disclosed in U.S. Pat. No. 4,189,735 (Japanese Patent Application Laid-open No. 54-126005).

Since, however, the information in the optical card is reproduced usually by causing the optical card to move alternately backward and forward with respect to a reproducing laser beam, there is a point of time at which the speed of movement relative to the reproducing light on the optical card decreases. The relative speed becomes zero with the reverse of the direction of movement of the optical card when the reproduction from one track of the information recording track has been completed and the next reproduction turns to another one of information recording tracks of the plurality as previously described. In conventional optical cards, the recording layer corresponding to the region irradiated with the reproducing light at this time, that is, the region 21 in which the movement of the optical card is stopped and reversed (hereinafter "stop-and-reverse region") is irradiated with the reproducing light for a long time. As a result, the problem has been caused such that the materials of the recording layer are deteriorated by light or heat to cause a decrease in reflectance or that this reproducing light tends to cause writing. For example, if the reflectance has decreased on the recording layer in the stop-and-reverse region, the tracking by the laser beam can not be carried out in this region, so that it becomes impossible to detect the track in or from which information is recorded or reproduced. In addition, the focusing of the reproducing light, which relies on the reflected light of the reproducing light, can not be carried out. Namely, the optical card having a decrease in reflectance in the stop-and-reverse region of the optical card no longer enables reproduction.

For this reason, it has been impossible in the conventional optical cards to so much increase the power of the reproducing laser beam and hence has been impossible to reproduce signals with a satisfactorily high S/N ratio.

In the meantime, as a means for solving such problems, the present applicant has disclosed in European Patent Publication No. 259151 a method in which an optical unrecordable member that can have a reflectance equal to that of the recording region is provided at a marginal area other than the recording region.

In this method, however, it is difficult to select the member that can maintain the same amount of reflected light between the recording region and the region other than that. There is also a disadvantage that faulty operations such as out-of-AT (auto-tracking) or out-of-AF (auto-focusing) tend to occur.

As commonly known, there is another method in which a stabilizing agent effective in preventing heat deterioration is added to the recording layer. In this method, however, although the decrease in reflectance in the stop-and-reverse region 21 can be prevented to a certain extent, the recording sensitivity in the recording region 34 may concurrently decrease to cause the problem that a difficulty may occur in achieving a higher recording speed.

The addition of the stabilizing agent also can not bring about so much improvement in the intensity of the reproducing light when the decrease in reflectance or the writing in the stop-and-reverse region is taken into account.

The present applicant has also disclosed in European Patent Publication No. 280531 a method in which a film cover layer is laminated to the recording region on an organic optical recording layer without interposing an adhesive layer between them, to improve the recording sensitivity in the recording region. According to this method, the region not provided with this film cover layer has a close-contact structure to bring about a decrease in recording sensitivity, so that the recording layer can be prevented from deteriorating due to the reproducing light in the stop-and-reverse region of the optical card. When, however, the intensity of the reproducing light is increased, this method is still unsatisfactory for preventing the deterioration of the recording layer in the stop-and-reverse region. In particular, a decrease in reflectance is caused by the heat accumulated by the reproducing light, because of the close contact of the adhesive layer having a low temperature diffusion rate.

SUMMARY OF THE INVENTION

The present invention was made in order to solve the above problems. Accordingly, an object of the present invention is to provide an optical recording medium having a superior recording sensitivity and also capable of reproducing signals with a high S/N ratio using a reproducing beam with a high intensity.

Another object of the present invention is to provide an optical recording medium that can be free from deterioration of the recording layer in the stop-and-reverse region even when a reproducing beam with a high intensity is used.

Still another object of the present invention is to provide a reproducing method, and a reproducing system, for an optical recording medium that can be free from deterioration of the recording layer in the stop-and-reverse region even when a reproducing beam with a high intensity is used.

A further object of the present invention is to provide a reproducing method for an optical recording medium that can reproduce signals with a high S/N ratio.

A still further object of the present invention is to provide a reproducing system for an optical recording medium that can reproduce signals with a high S/N ratio.

A still further object of the present invention is to provide an optical recording medium having a superior recording sensitivity and also having a uniform sensitivity and reflectance in the recording region.

The optical recording medium of the present invention comprises a substrate and, provided thereon, a recording layer, a recording auxiliary layer that covers a given region on the surface of said recording layer on its side not facing the substrate, and a recording restraining layer that covers the recording layer on its surface not covered with said recording auxiliary layer.

In a preferred embodiment, the optical recording medium of the present invention comprises a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its surface not covered with said recording auxiliary layer.

In another preferred embodiment, the optical recording medium of the present invention comprises a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its region other than the recording region;

said optical recording medium being subjected to reciprocating movement relative to recording and/or reproducing light to carry out recording and/or reproducing a datum; and said region other than the recording region of the recording layer in said medium being a region for tracking servo track access and auto-focusing, and a region irradiated with reproducing light when the direction of movement of said medium is reversed.

The reproducing method for the optical recording medium of the present invention is a method of reproducing recorded data of an optical recording medium comprising a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its region other than the recording region; an encoded datum being recorded in the recording layer corresponding to said recording region;

said method comprising the step of subjecting said optical recording medium to reciprocating movement in the direction parallel to said track so as for reproducing light to trace said track, during the step of which the movement direction of said optical recording medium is reversed when said region other than the recording region of said recording layer is irradiated with said recording medium.

In another embodiment, the method of reproducing recorded data of the optical recording medium of the present invention is a method of reproducing recorded data of an optical recording medium comprising a substrate having a track in a stripe on its surface, and a recording layer provided on the surface of said substrate;

said recording layer having a recording region sensitive to a recording beam with a given intensity to cause in said recording layer an optically detectable change, and a low-sensitivity region having a lower sensitivity than said recording region; an encoded datum being recorded in the recording layer corresponding to said recording region;

said method comprising the step of reproducing the recorded data, using a reproducing beam;

said reproducing beam having such an intensity that i) no change is caused in the recording layer corresponding to the recording region in the state where said recording medium is moved at a given speed with respect to said reproducing beam, ii) a change is caused in the recording layer corresponding to the recording region as a result of irradiation with said reproducing beam in the state where said recording medium is stopped and iii) no change is caused in the recording layer corresponding to said low-sensitivity region in the state where said recording medium is stopped.

The reproducing system for the optical recording medium of the present invention is a system for reproducing recorded data of an optical recording medium comprising a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its region other than said recording region; an encoded datum being recorded in the recording layer corresponding to said recording region;

said system comprising a means for irradiating said optical recording medium with a reproducing beam, and a driving means for subjecting said optical recording medium and said reproducing beam to relative reciprocating movement in the direction parallel to said track;

said system further comprising a means for controlling said driving means in such a manner that the driving direction is reversed in the state where said optical recording medium is irradiated with said reproducing beam on its recording layer region other than the recording region.

In another embodiment, the data reproducing system is a system for reproducing recorded data of an optical recording medium comprising a substrate having a track in a stripe on its surface, and provided thereon a recording layer having a recording region sensitive to a recording beam with a given intensity to cause in said recording layer an optically detectable change, and a low-sensitivity region having a lower sensitivity than said recording region; an encoded datum being recorded in the recording layer corresponding to said recording region;

said system comprising;

a means for irradiating said optical recording medium with a reproducing beam to reproduce a datum therefrom, and a driving means for subjecting said optical recording medium to relative reciprocating movement in the direction parallel to said track, with respect to said reproducing beam; and a means for generating a reproducing beam with which said optical recording medium is irradiated; said reproducing beam having such an intensity that i) no change is caused in the recording layer corresponding to the recording region in the state where said recording medium is moved at a given speed with respect to said reproducing beam, ii) a change is caused in the recording layer corresponding to the recording region as a result of irradiation with said reproducing beam in the state where said recording medium is stopped and iii) no change is caused in the recording layer corresponding to said low-sensitivity region in the state where said optical recording medium is stopped.

As another embodiment of the optical recording medium of the present invention, the optical recording medium comprises a substrate and, provided thereon, a recording layer and a recording auxiliary layer that covers a given region on the surface of said recording layer on its side not facing the substrate; said recording auxiliary layer being formed of a coating comprising a polymeric compound having a rubber elasticity.

BRIEF DESCRIPTION OF THE DRAWING

FIGS. 1A to 1C schematically illustrate an optical card according to the present invention, in which FIG. 1A is a cross section in the direction parallel to track grooves of the optical card according to the present invention, FIG. 1B is a plan view of the optical card according to the present invention, and FIG. 1C is a cross section in the direction transversely crossing the track grooves, i.e. along the line 8—8' in FIG. 1A, of the optical card according to the present invention.

FIGS. 2A and 2B schematically illustrate a conventional optical card, in which FIG. 2A is a cross section in the direction parallel to track grooves of the conventional optical card, and FIG. 2B is a cross section in the direction transversely crossing the track grooves of the conventional optical card.

FIGS. 11A and 11B are each a graph to show energy sensitivity at the time when optical cards of Examples of the present invention are driven or stopped, in which FIG. 11A is concerned with Example 1, and FIG. 11B, Example 2.

FIGS. 12A and 12B are each a graph to show energy sensitivity at the time when optical cards of Comparative Examples are driven or stopped, in which FIG. 12A is concerned with Comparative Example 1, and FIG. 12B, Comparative Example 2.

FIGS. 13A to 13C are each a graph to show energy sensitivity at the time when optical cards are driven or stopped, in which FIG. 13A is concerned with Example 3, FIG. 13B, Comparative Example 3, and FIG. 13C, Comparative Example 4.

FIGS. 14A and 14B illustrate reference example optical cards, cross-sectional in the direction parallel to their track grooves, in which FIG. 14A is concerned with Reference Example 1, and FIG. 14B, Reference Example 3.

DESCRIPTION OF THE PREFERRED EMBODIMENTS

The present invention will be described below in detail with reference to the accompanying drawings.

Figure 1A:
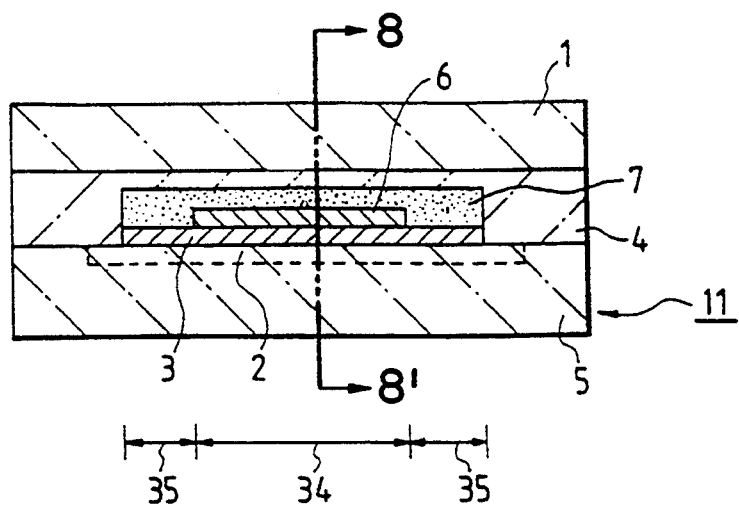
Figure 1B:
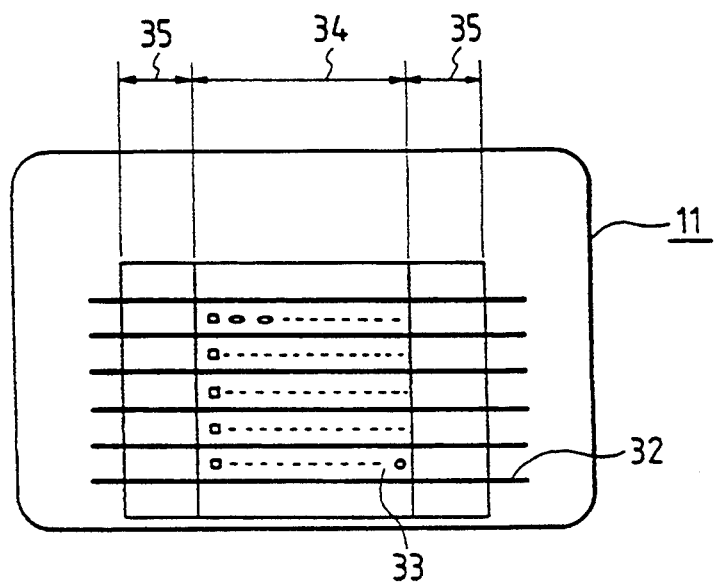
Figure 1C:
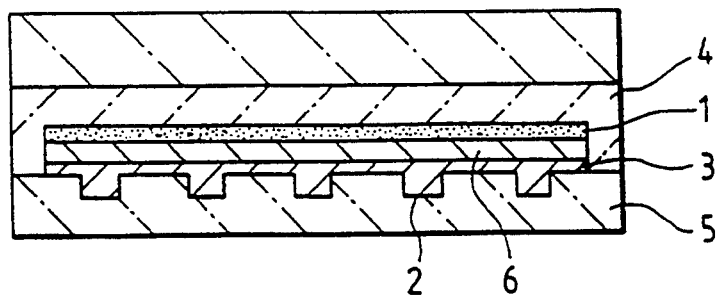
Figure 2A:
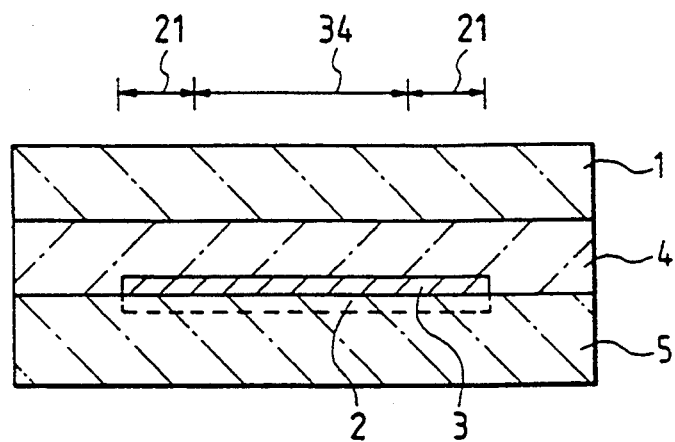
Figure 2B:
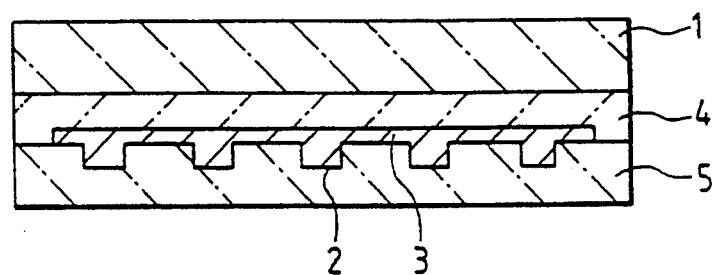
Figure 3:
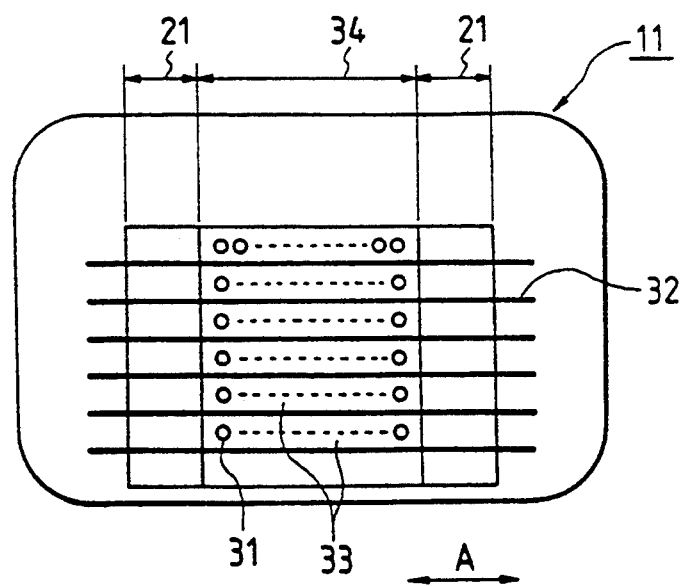
FIG. 3 is a diagrammatical plan view showing a commonly available recording format of an optical card.
Figure 4:
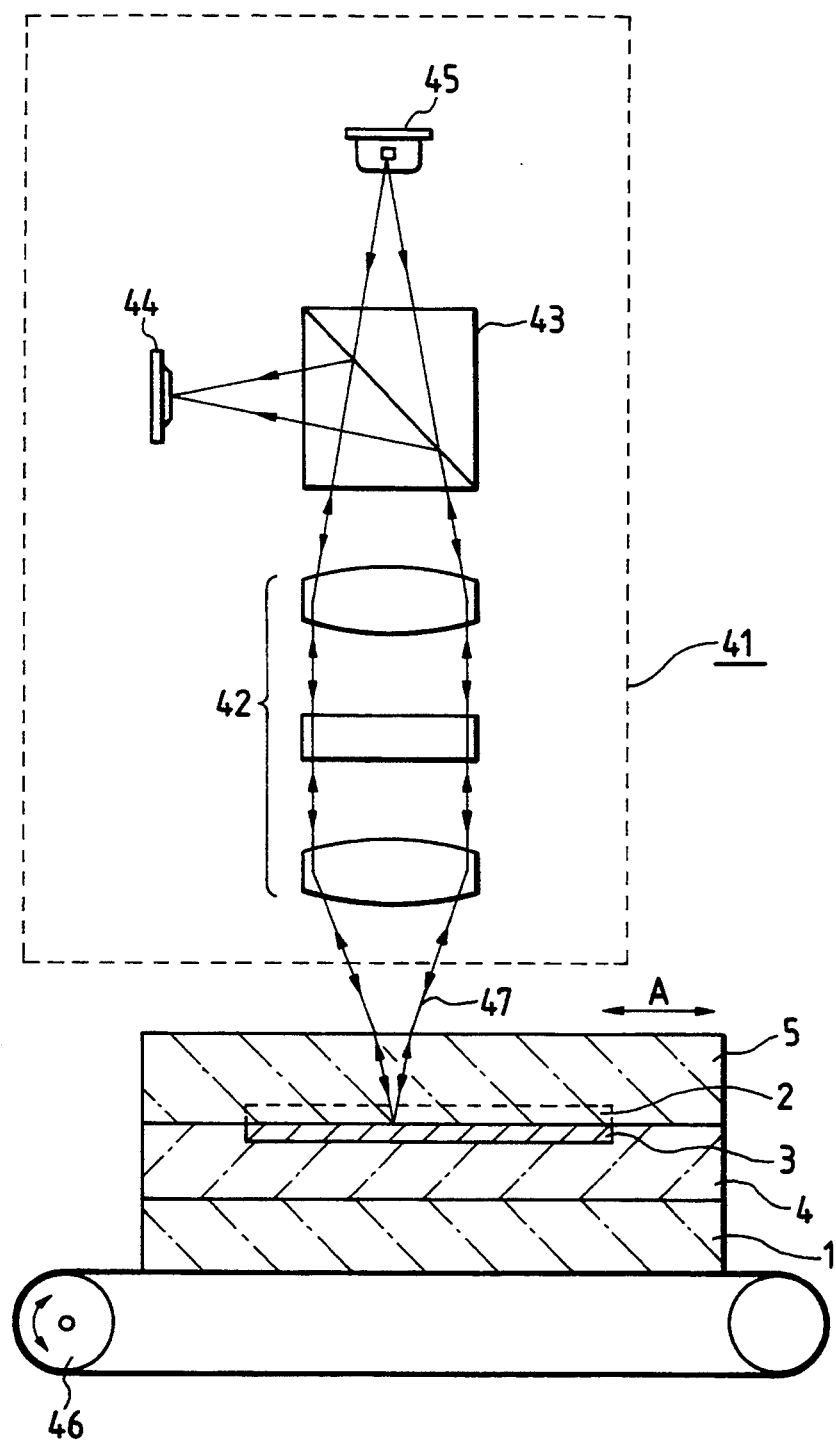
FIG. 4 is a schematic view to show the constitution of a commonly available recording-reproducing apparatus for an optical card.

FIGS. 1A to 1C schematically illustrate an embodiment of the optical card according to the present invention. FIG. 1A is a cross section in the direction parallel to track grooves 2 of an optical card 11.

In FIG. 1A, reference numeral 5 denotes a transparent substrate on the surface of which track grooves are formed; 3, a recording layer with reflecting properties, formed on the surface of the substrate 5; 6, a recording auxiliary layer laminated onto a recording region 34 of the recording layer; 7, a recording restraining layer laminated on the recording layer on its region other than the recording region.

Reference numeral 4 denotes an adhesive layer; and 1, a protective substrate.

FIG. 1B is a plan view of the optical card 11, in which reference numeral 33 denotes information recording tracks; and 32, track grooves. Reference numeral 34 indicates the recording region. Data are recorded in the information recording tracks within this recording region. Reference numeral 35 denotes recording layer regions other than the recording region 34.

FIG. 1C is a schematic cross section along the line 8—8' in FIG. 1A.

In the present invention, the recording auxiliary layer 6 may preferably be a layer that does not inhibit any changes, e.g., deformation, decoloring and sublimation caused in the recording layer as a result of irradiation with a recording beam when data are recorded in the recording layer, and also have a function of promoting the occurrence of such changes.

Materials usable as the recording auxiliary layer that does not inhibit the changes caused in the recording layer may vary depending on what changes are to be caused in the recording layer to carry out the recording. For example, in the case when data are recorded by causing a deformation of the recording layer, the materials may include those which do not inhibit the deformation and also do not adversely affect the recording layer, as exemplified by a polymeric compound having a rubber elasticity.

More specifically, it is preferable to use a polymeric compound having a hardness of not less than 2 and not more than 70, particularly not less than 3 and not more than 60, and more particularly not less than 5 and not more than 40, as measured according to ASTM D2240 (using a spring type hardness tester, Type-A; JIS K6301).

For the recording auxiliary layer capable of promoting the changes, it is preferable to use, for example, a material that does not allow the heat generated in the recording layer to diffuse from the recording layer and can effectively utilize the heat to cause the changes in the recording layer. Such a material may preferably include, for example, materials having a low thermal diffusivity (=heat conductivity/heat capacity), stated specifically, a thermal diffusivity of not more than $1 \times 10^{-3}$ cm$^2$/s, and particularly from $1 \times 10^{-4}$ to $1 \times 10^{-3}$ cm$^2$/s. In the case when data are recorded by causing a deformation of the recording layer, it is also preferable to use a material that does not inhibit the deformation of the recording layer. Such a material may preferably be appropriately selected from silicone rubber, urethane rubber, styrene rubber, butadiene rubber, etc. In particular, silicone rubber does not inhibit the deformation of the recording layer and also does not cause decomposition or the like due to the heat of not so high temperature that may be generated in the recording layer, and hence can be preferably used as a material for the recording layer in the case when data are recorded by causing a deformation of the recording layer.

The recording auxiliary layer may preferably be of a thickness of from 0.1 to 50 μm, and particularly from 0.5 to 10 μm.

The materials used in the recording auxiliary layer described above may preferably be materials capable of being formed on the recording layer by coating. That is, when formed by coating, the recording auxiliary layer can be accurately formed on the recording region of the recording layer and also can give a uniform recording sensitivity in the recording region. In addition, the recording auxiliary layer formed by coating does not cause any non-uniformity in recording sensitivity or non-uniformity in reflectance against the bend that tends to occur in pocket optical recording mediums.

Such materials may specifically include, for example, ultraviolet-curing silicone rubbers and thermosetting silicone rubbers. Any of these may be coated on the recording layer, followed by curing by a given method. Thus the recording auxiliary layer can be formed.

A resin film may also be used as the recording auxiliary layer. In this instance, the resin film may be laminated to the recording layer without interposing any adhesive layer between them, so that the deformation of the recording layer, accompanying the recording, is not inhibited because of formation of a microscopic air layer between the recording layer and resin film, and also the heat can be utilized with an improved efficiency, making it possible to improve the recording sensitivity in the recording region. The resin film used here may include films of, for example, an acrylic resin, a polyester resin, a polycarbonate resin, a vinyl resin, a polysulfone resin, a polyimide resin, a polyacetal resin, a polyolefin resin, a polyamide resin, a vinylidene resin, a cellulose derivative, or a copolymer of any of these, including a vinyl chloride/vinyl acetate copolymer, an ethylene/vinyl acetate copolymer, an ethylene/acrylate copolymer, a vinyl acetate/acrylate copolymer and a styrene/butadiene copolymer, or a silicone rubber formed into a sheet.

Of these materials, a silicone rubber formed into a sheet or a polyester resin, in particular, polyethylene terephthalate are particularly preferred.

This resin film may preferably be in a thickness of from 0.05 to 100 $\mu$m, and particularly from 0.1 to 50 $\mu$m.

Referring now to the recording restraining layer 7 in the optical card of the present invention, materials preferably used therefor are those by which the intensity of an energy beam necessary to cause any change (e.g., in reflectance) in the recording layer in its region other than the recording region of the optical card can be made larger than the intensity of an energy beam necessary to cause a change in the recording layer corresponding to the recording region. In other words, the recording layer regions 35 other than the recording region can be made to have a lower sensitivity than the recording region, and also those by which the reflectance of the recording layer corresponding to this region 35 is not lowered. Stated specifically, the materials may include, for example, those having a high thermal diffusivity, being capable of diffusing the heat, an accumulation of which may cause a deterioration of the recording layer. Herein, the material having a high thermal diffusivity may preferably have a higher thermal diffusivity than usual resin materials having a value of, for example, $1 \times 10^{-3}$ cm$^2$/s. In particular, preferably used is a material having a value of from $1 \times 10^{-2}$ cm$^2$/s to 2 cm$^2$/s, and more preferably from $1 \times 10^{-2}$ cm$^2$/s to 1 cm$^2$/s, and a value larger by at least one figure than the usual resin having a value of $1 \times 10^{-3}$ cm$^2$/s.

Such a material may include, for example, inorganic dielectrics such as $SiO_2$, $TiO_2$, $Si_3N_4$, $Al_2O_3$, ZnO, AlN and ZnS and metals such as Al, Ag and Au. Any of these materials may be formed into a layer by vacuum deposition or the like. It is also possible to use a resin adhesive with an improved thermal diffusivity, comprised of metal particles or particles of inorganic dielectrics such as alumina. In this instance, it is possible to integrate the recording restraining layer 7 and the adhesive layer 4 as shown in FIG. 5B.

In the case when in the present invention a material with a high thermal diffusivity, such as $Si_3N_4$ or the above metals is used as the recording restraining layer, the region 35 can be made to have a much lower sensitivity and hence the intensity of the reproducing light can be made higher. This is preferable since an optical card capable of reproducing signals with a superior S/N ratio can be obtained. The relationship between the optical recording medium of the present invention and the intensity of reproducing light will be described later.

The thickness of the recording restraining layer of the present invention may vary depending on the materials used. It may preferably be in the range of from about 0.01 to 50 $\mu$m. In particular, when the metals or the inorganic dielectrics are used, a satisfactory restraining effect can be obtained if the thickness is in the range of from about 0.01 to 1 $\mu$m.

As materials for the recording auxiliary layer and recording restraining layer of the present invention, it is preferable to select materials such that the refractive indexes of the recording region 34 and the regions 35 other than the recording region may come close to each other so that the reflectance does not greatly differ between the both regions. A combination of the recording auxiliary layer and recording restraining layer can be exemplified by a combination comprised of a silicone rubber and an ethylene/vinyl acetate copolymer in which metal particles have been dispersed.

In the case when a reflecting material such as metal is used as the material for the recording restraining layer, the recording restraining layer 7 may be so formed as to give a laminated structure as shown in FIG. 1A, i.e., to cover not only the region 35 but also the recording auxiliary layer 6 so that the reflectance does not greatly differ between the recording region 34 and the regions 35 other than the recording region.

Figure 5A:
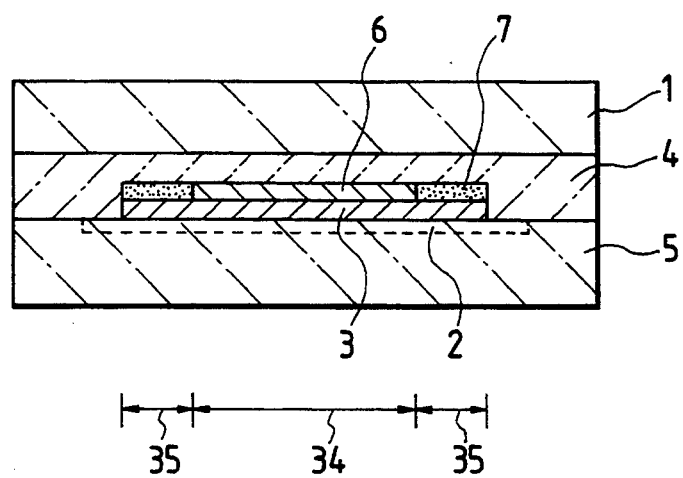
FIGS. 5A and 5B are schematic views to show other embodiments of the optical card according to the present invention.
Figure 5B:
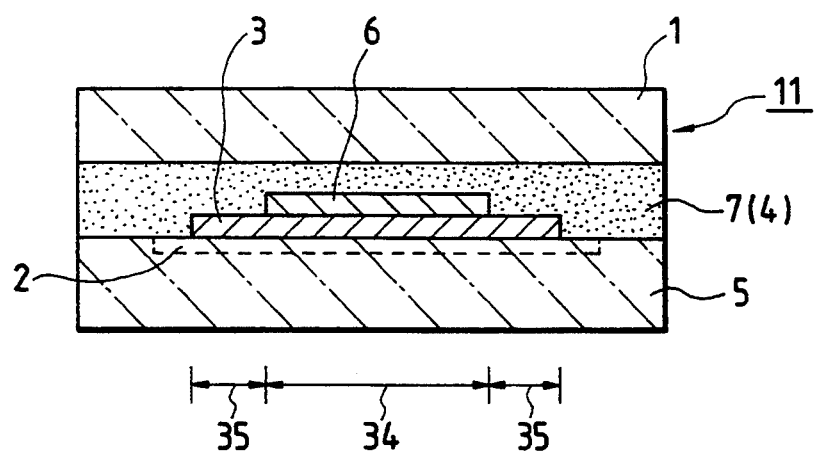

FIGS. 5A and 5B schematically illustrate another embodiment of the optical card according to the present invention, which is an embodiment in which the recording restraining layer 7 and the recording auxiliary layer 6 are laminated in the respective regions.

The transparent substrate 5 of the optical recording medium according to the present invention may preferably be made of a material that may cause less difficulty in the optical recording-reproducing, and it is possible to use, for example, an acrylic resin, a polyester resin, a polycarbonate resin, a vinyl resin, a polysulfone resin, a polyimide resin, a polyacetal resin, a polyolefin resin, a polyamide resin or a cellulose derivative.

When the transparent substrate is made of a thermoplastic resin, the track grooves 2 can be formed on the transparent substrate by injection molding at a temperature higher than its melting point, or by a method in which a stamper mold pattern is thermally transferred by hot pressing or a method in which a stamper mold pattern is photo-transferred by a process comprising coating a photocurable resin composition on the transparent substrate and bringing a stamper mold into close contact therewith, followed by exposure to ultraviolet rays or the like to cure the photocurable resin composition.

In the case of the thermal transfer method, the track groove portion and the transparent substrate are comprised of the same body. On the other hand, in the case of the photo-transfer method, the track groove portion and the transparent substrate are not comprised of the same body and the former is adhered to the latter. Alternatively, besides the stamper mold pattern transfer method, the track grooves can also be formed on the transparent substrate by forming a resist film on a transparent substrate having a light-transmissive thin film in the desired thickness, exposing the resist film to light through a photomask having a pattern of track grooves followed by developing to form a resist pattern, and etching the thin film using the resist pattern as a mask.

Such a transparent substrate 5 may also be optionally subjected to pretreatment such as corona discharge treatment, plasma treatment, primer treatment or ozone treatment for the purpose of improving adhesion.

The protective substrate 1 can be formed using every material that can be used as materials for conventional card substrates, specifically including polyvinyl chloride, a fluorine-substituted ethylene polymer, a vinyl chloride/vinyl acetate copolymer, polyvinylidene chloride, acrylic polymers such as polymethyl methacrylate, polystyrene, polyvinyl butyral, acetyl cellulose, a styrene/butadiene copolymer, polyethylene, polypropylene, polycarbonate, epoxy, and an acrylonitrile/butadiene/styrene copolymer.

In some instances, a great variety of materials can be used according to the purpose, as exemplified by sheets of metals such as iron, stainless steel, aluminum, tin, copper and zinc, synthetic papers, papers, fiber-reinforced plastics, a composite material of magnetic material metal powder and plastic, and ceramics. Of course, the material used in the transparent substrate may also be used.

In the vicinity of the wavelength of a light source used, for example, in instances in which the reproducing energy beam has a wavelength of 650 nm or more, and particularly from 700 to 900 nm, the optical recording layer 3 may preferably have a large difference in reflectance between the recording areas (pits or the like) and the non-recording areas, and also must have an absorption in the above wavelength region in order to carry out writing.

The energy necessary to cause changes in reflectance as a result of irradiation with a recording energy beam should preferably be smaller. It is also preferable that the reproducing energy beam does not tend to cause a change in reflectance between the recording areas (pits or the like) and the non-recording areas.

As the recording layer, an organic thin film capable of undergoing optical changes in physical properties by the action of the energy beam enables continuous coating using a solution or dispersion system and hence is preferable for mass production.

Materials for this thin film may include, for example, anthraquinone derivatives (those having an indanthrene skeleton in the main chain), dioxazine compounds and derivatives thereof, triphenodithiazine compounds, phenanthrene derivatives, cyanine compounds, merocyanine compounds, pyrylium compounds, xanthene compounds, triphenylmethane compounds, croconium compounds, azo dyes, croconics, azines, indigoids, methine dyes, polymethine dyes, azulene dyes, squarium dyes, sulfur dyes, and dithiolato complexes of metals.

The present invention is particularly effective for an optical recording medium comprising a recording layer in which a cationic coloring matter as shown below is used.

The cationic coloring matter may include the following:

Polymethine dye represented by Formula (I):

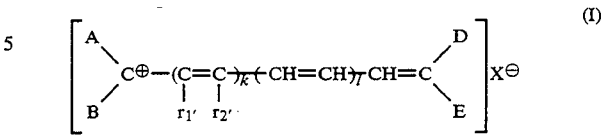

wherein, A, B, D and E each represent a hydrogen atom or a group selected from an alkyl group having 2 or more carbon atoms, an alkenyl group, an aralkyl group, an aryl group, a styryl group and a heterocyclic group, $r_1'$ and $r_2'$ each represent a group selected from an alkyl group, a cyclic alkyl group, an alkenyl group, an aralkyl group and an aryl group; and k represents 0 or 1; 1, 0, 1 or 2; and $X^\ominus$, an anion.

The aralkyl group, aryl group, styryl group or heterocyclic group in the definition for A, B, C, D, E, $r_1'$ and $r_2'$ may have a substituent.

Dye represented by Formula (II):

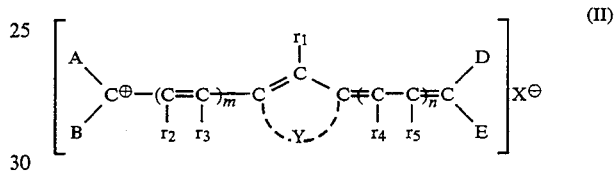

wherein A, B, D, E and $X^\ominus$ each are as defined above; $r_1$ to $r_5$ each represent a hydrogen atom, a halogen atom, an alkyl group or an aryl group; Y represents a divalent residual group having a group of atoms necessary for completing a ring of 5 or 6 members; m and n each represent 0, 1 or 2.

Dye represented by Formula (III):

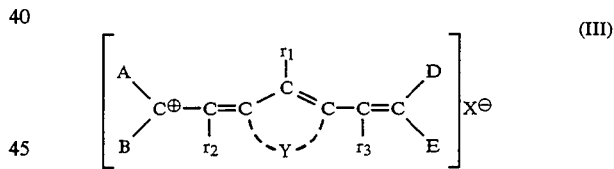

wherein A, B, D, E, $r_1$, $r_2$, $r_3$, Y and $X^\ominus$ are as defined above.

Dye represented by Formula (IV):

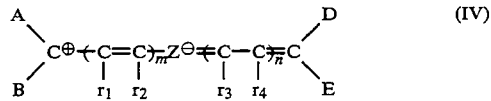

wherein A, B, D, E, $r_1$, $r_2$, $r_3$, $r_4$, m and n are as defined above, and $Z^\ominus$ represents

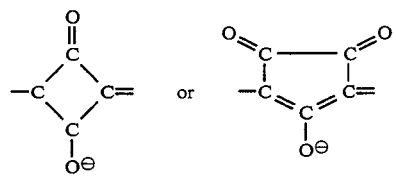

Azulenium dye represented by Formula (V), (VI) or (VII):

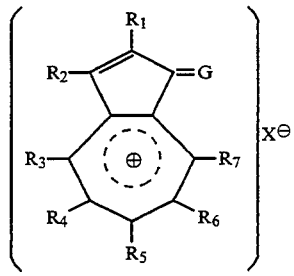

(V)

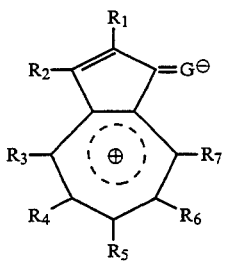

(VI)

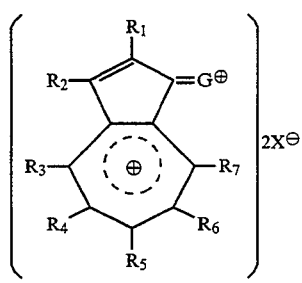

(VII)

Herein, $R_1$ to $R_7$ each represent a hydrogen atom, a halogen atom (including a chlorine atom, a bromine atom and an iodine atom) or a monovalent organic residual group. The monovalent organic group can be selected from the groups covering a wide range.

A substituted or unsubstituted condensed ring may also be formed by at least one combination of the combinations of $R_1$ with $R_2$, $R_2$ with $R_3$, $R_3$ with $R_4$, $R_4$ with $R_5$, $R_5$ with $R_6$ and $R_6$ with $R_7$. The condensed ring includes condensed rings of 5, 6 or 7 members, including aromatic rings (such as benzene, naphthalene, chlorobenzene, bromobenzene, methyl benzene, ethylbenzene, methoxybenzene and ethoxybenzene), heterocyclic rings (such as a furan ring, a benzofuran ring, a pyrrol ring, a thiophene ring, a pyridine ring, a quinoline ring and a thiazole ring) and aliphatic rings (such as dimethylene, trimethylene and tetramethylene).

$X^\ominus$ is as defined above and represents an anion.

G represents a divalent organic residual group combined by a double bond. Specific examples in the present invention, containing such G, may include those represented respectively by Formulas (1) to (11). In the formula, $Q^\oplus$ represents an azulenium salt nucleus shown below, and the right side excluding $Q^\oplus$ in the formula indicates G.

Azulenium salt nucleus ($Q^\oplus$):

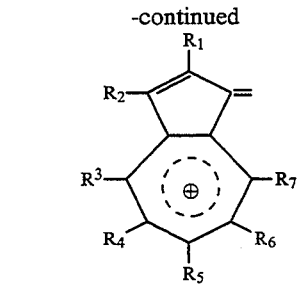

Formula:

(1)

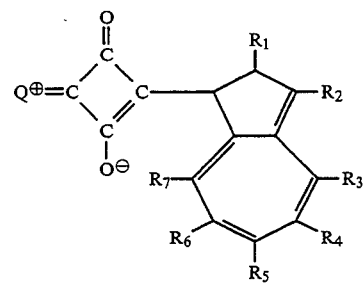

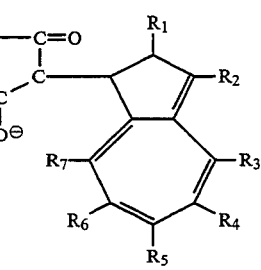

(3)

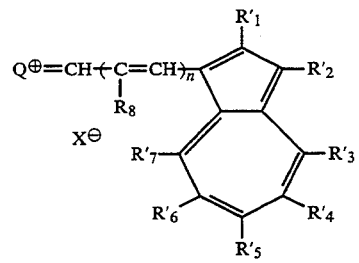

$R_1'$ to $R_7'$ are as defined for $R_1$ to $R_7$.

Also, the azulenium salt nucleus represented by $Q^\oplus$ and the azulene salt nucleus at the right side in the above Formula (3) may be symmetrical or unsymmetrical.

(4)

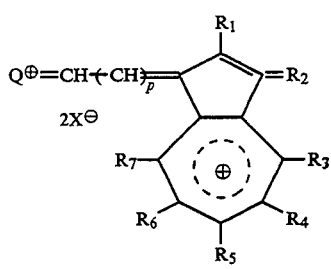

(5)

-continued

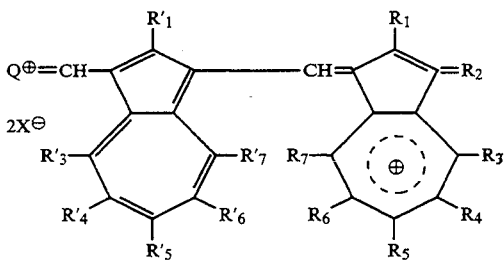

(6)

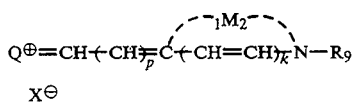

(7)

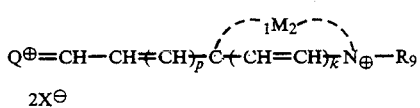

In the formula, M represents a group of non-metal atoms necessary for completing a nitrogen-containing heterocyclic ring.

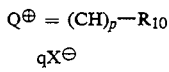 (8)

In the formula, $R_{10}$ represents a substituted or unsubstituted aryl group or a cationic group thereof. P represents an integer of 1 to 8. q is 1 or 2.

$$Q^{\oplus} = (CH)_p - R_{11} \quad qX^{\ominus}$$ (9)

In the formula, $R_{11}$ represents a heterocyclic group or a cationic group thereof.

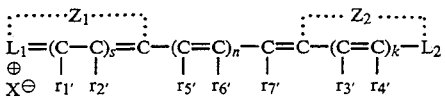

In the formula, $R_{12}$ represents a hydrogen atom, an alkyl group or a substituted or unsubstituted aryl group.

$$Q^{\oplus}=(CH)-C\equiv C-R_{10} \quad X^{\ominus} \quad p$$ (11)

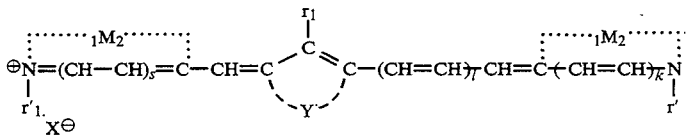

In the formula, $Z_2$ represents a group of atoms necessary for completing pyran, thiapyran, selenapyran, telluropyran, benzopyran, benzothiapyran, benzoselenapyran, benzotelluropyran, naphthopyran, naphthothiapyran or naphthotelluropyran that may be substituted.

L represents a sulfur atom, an oxygen atom, a selenium atom or a tellurium atom.

$R_{13}$ and $R_{14}$ each represent a hydrogen atom, an alkoxyl group, a substituted or unsubstituted aryl group, an aralkenyl group or a heterocyclic group.

Preferable coloring matters include the dyes represented respectively by Formulas (VIII), (IX), (X) and (XI).

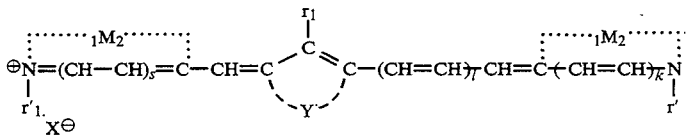

Formula (VIII)

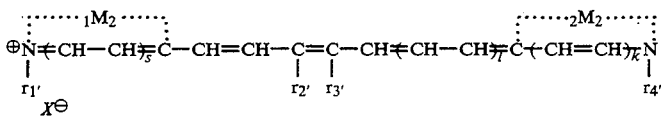

Formula (IX)

Formula (X)

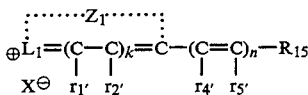

Formula (XI)

In the above Formulas (VIII), (IX), (X) and (XI), $L_1$ and $L_2$ each represent a substituted nitrogen atom, sulfur atom, oxygen atom, selenium atom or tellurium atom; $Z_1$ represents a group of atoms necessary for completing pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium that may be substituted; $Z_2$ represents a group of atoms necessary for completing pyran, thiapyran, selenapyran, telluropyran, benzopyran, benzothiapyran, benzoselenapyran, benzotelluropyran, naphthopyran, naphthothiopyran, naphthoselenapyran or naphthotelluropyran that may be substituted. Symbol s is 0 or 1. $R_{15}$ represents a substituted or unsubstituted aryl group or a substituted or unsubstituted heterocyclic group. (Symbols $r_3'$ to $r_7'$ are as defined for $r_1'$ and $r_2'$ described above.)

Symbols k, n, M, $r_1'$, $r_2', r_1$, Y, $Z^\ominus$ and $X^\ominus$ are as defined above.

Symbols in the above formulas will be defined below in greater detail.

A, B, D and E each represent a hydrogen atom or an alkyl group (for example, a methyl group, an ethyl group, a n-propyl group, an iso-propyl group, a n-buryl group, a sac-buryl group, an iso-butyl group, a t-buryl group, a n-amyl group, a t-amyl group, a n-hexyl group, a n-octyl group, a t-octyl group), including other alkyl groups as exemplified by substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, a 4-(acetylsulfamyl)butyl group), cyclic alkyl groups (for example, a cyclohexyl group), alkenyl groups (for example, a vinyl group, a propenyl group, a butanyl group, a pentanyl group, a hexenyl group, a haptanyl group, an octenyl group, a dodecynyl group, a pulenyl group), aralkyl groups (for example, a benzyl group, a phenethyl group, an α-naphthylmethyl group, a β-naphthylmethyl group), substituted aralkyl groups (for example, a carboxybenzyl group, a sulfobenzyl group, a hydroxybenzyl group). $R_1$, $R_2$, $R_3$, $R_4$ and $R_5$ each represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group), a substituted or unsubstituted heterocyclic group (for example, a pyridyl group, a quinolyl group, a lepidyl group, a methylpyridyl, a furyl group, a thienyl group, an indolyl group, a pyrol group, a carbazolyl group, an N-ethylcarbazolyl group) or a substituted or unsubstituted styryl group (for example, a styryl group, a methoxystyryl group, a dimethoxystyryl group, a trimethoxystyryl group, an ethoxystyryl group, a dimethylaminostyryl group, a diethylaminostyryl group, a dipropylaminostyryl group, a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-(diethylaminophenyl)vinyl group, a 2,2-di(-methoxyphenyl)vinyl group, a 2,2-di(ethoxyphenyl)vinyl group, a 2-(dimethylaminophenyl)-2-methylvinyl group, a 2-(diethylaminophenyl)-2-ethylvinyl group.

Symbols $r_1'$, $r_2'$, $r_3'$, $r_4'$, $r_5'$, $r_6'$ and $r_7'$ each represent a hydrogen atom or an alkyl group (for example, a methyl group, an ethyl group, a n-propyl group, an iso-propyl group, a n-butyl group, a sec-butyl group, an iso-butyl group, a t-butyl group, a n-amyl group, a t-amyl group, a n-hexyl group, a n-octyl group, t-octyl group), including other alkyl groups as exemplified by substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, a 4-(acetylsulfamyl)butyl group), cyclic alkyl groups (for example, a cyclohexyl group), alkenyl groups (for example, a vinyl group, a propenyl group, a butenyl group, a pentenyl group, a hexenyl group, a heptenyl group, an octenyl group, a dodecynyl group, a pulenyl group), aralkyl groups (for example, a benzyl group, a phenethyl group, an α-naphthylmethyl group, a β-naphthylmethyl group), substituted aralkyl groups (for example, a carboxybenzyl group, a sulfobenzyl group, a hydroxybenzyl group). $R_1$, $R_2$, $R_3$, $R_4$ and $R_5$ each represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group); $r_1$, $r_2$, $r_3$, $r_4$ and $r_5$ each represent a hydrogen atom, a halogen atom (such as a chlorine atom, a bromine atom and an iodine atom), an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy) or a substituted or unsubstituted aryl group (such as phenyl, tolyl, xylyl, ethylphenyl, methoxyphenyl, ethoxyphenyl, chlorophenyl, nitrophenyl, dimethylaminophenyl, α-naphthyl and β-naphthyl). Y represents a divalent hydrocarbon group as exemplified by

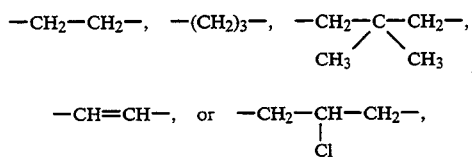

and the 5-membered ring or 6-membered ring of these may be condensed with a benzene ring, a naphthalene ring or the like.

$R_1$ to $R_7$ and $R_1'$ to $R_7'$ each represent an atom or group including a hydrogen atom and a halogen atom (such as a chlorine atom, a bromine atom and an iodine atom), as well as an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy), a substituted or unsubstituted aryl group (such as phenyl, tolyl, xylyl, ethylphenyl, methoxyphenyl, ethoxyphenyl, chlorophenyl, nitrophenyl, dimethylaminophenyl, α-naphthyl and β-naphthyl), a substituted or unsubstituted aralkyl group (such as benzyl, 2-phenylethyl, 2-phenyl-1-methylphenyl, bromobenzyl, 2-bromophenylethyl, methylbenzyl, methoxybenzyl and nitrobenzyl), an acyl group (such as acetyl, propionyl, butyryl, valeryl, benzoyl, tolyloyl, naphthoyl, phthaloyl and furoyl), a substituted or unsubstituted amino group (such as amino, dimethylamino, diethylamino, dipropylamino, acetylamino and benzoyl amino), a substituted or unsubstituted styryl group (such as styryl, demethylaminostyryl, diethylaminostyryl, dipropylaminostyryl, methoxystyryl, ethoxystyryl and methylstyryl), a nitro group, a hydroxyl group, a carboxyl group, a cyano group or a substituted or unsubstituted arylazo group (such as phenylazo, α-naphthylazo, β-naphthylazo, dimethylaminophenylazo, chlorophenylazo, nitrophenylazo, methoxyphenylazo and tolylazo).

$R_1'$ to $R_7'$ may also form a condensed ring as in the case of $R_1$ to $R_7$.

$R_8$ represents a hydrogen atom, a nitro group, a cyano group, an alkyl group (such as methyl, ethyl propyl and butyl) or an aryl group (such as phenyl, tolyl and xylyl).

$R_9$ represents an alkyl group (such as methyl, ethyl, propyl and butyl), a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl and 3-carboxypropyl), a cyclic alkyl group (such as cyclohexyl and cyclopropyl), an arylaralkyl group (such as benzyl, 2-phenylethyl, 3-phenylpropyl, 4-phenylbutyl, α-naphthylmethyl and β-naphthylmethyl), a substituted aralkyl group (such as methylbenzyl, ethylbenzyl, dimethylbenzyl, trimethylbenzyl, chlorobenzyl and bromobenzyl), an aryl group (such as phenyl, tolyl, xylyl, α-naphthyl and β-naphthyl) or a substituted aryl group (such as chlorophenyl, dichlorophenyl, trichlorophenyl, ethylphenyl, methoxyphenyl, dimethoxyphenyl, aminophenyl, nitrophenyl and hydroxyphenyl).

$R_{10}$ represents a substituted or unsubstituted aryl group (such as phenyl, tolyl, xylyl, biphenyl, α-naphthyl, β-naphthyl, anthranyl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl and cyanophenyl).

$R_{11}$ represents a monovalent heterocyclic group derived from a heterocyclic ring such as furan, thiophene, benzofuran, thionaphthene, dibenzofuran, carbazole, phenothiazine, phenoxazine or pyridine.

$R_{12}$ represents a hydrogen atom, an alkyl group (such as methyl, ethyl, propyl and butyl) or a substituted or unsubstituted aryl group (such as phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl and pyrenyl).

$R_{13}$ and $R_{14}$ each represent a hydrogen atom, an alkyl group (such as methyl, ethyl, propyl and butyl), an alkoxy group (such as methoxy, ethoxy, propoxy, ethoxyethyl and methoxyethyl), an aryl group (such as phenyl, tolyl, xylyl, chlorophenyl, biphenyl and methoxyphenyl), a substituted or unsubstituted styryl group (such as styryl, p-methoxystyryl, o-chlorostyryl and p-methoxystyryl), substituted or unsubstituted 4-phenyl-1,3-butadienyl group (such as 4-phenyl-1,3-butadienyl and 4-(p-methylphenyl)-1,3-butadienyl) or a substituted or unsubstituted heterocyclic ring (such as quinolyl, pyridyl, carbazolyl and furyl).

M represents a group of atoms necessary for completing a nitrogen-containing heterocyclic ring such as pyridine, thiazole, benzothiazole, naphthoxazole, oxazole, benzoxazole, naththoxazole, imidazole, benzimidazole, naphthoimidazole, 2-quinoline, 4-quinoline, isoquinoline or indole, and may be substituted with a halogen atom (such as a chlorine atom, a bromine atom and an iodine atom), an alkyl group (such as methyl, ethyl, propyl and butyl), an aryl group (such as phenyl, tolyl and xylyl) or an aralkyl group (such as benzyl and p-tolylmethyl).

Symbols $r_1'$ to $r_7'$ each represent a hydrogen atom, a substituted or unsubstituted alkyl group (such as methyl, ethyl, propyl, isopropyl, butyl, t-butyl, amyl, isoamyl, hexyl, octyl, nonyl, dodecyl, methoxyethyl, hydroxyethyl and carboxypropyl), a substituted or unsubstituted aryl group (such as phenyl, α-naphthyl, β-naphthyl, tolyl, xylyl, biphenyl, ethylphenyl, methoxyphenyl, ethoxyphenyl, dimethoxyphenyl, hydroxyphenyl, chloroxyphenyl, dichlophenyl, bromophenyl, dibromophenyl, nitrophenyl, diethylaminophenyl, dimethylaminophenyl and dibenzylaminophenyl), a substituted or unsubstituted aralkyl group (such as benzyl, phenethyl, 3-phenylpropyl, methoxybenzyl, methylbenzyl and chlorobenzyl).

Symbols k and s each are 0 or 1, and l, m, n each are 1 or 2.

$X^\ominus$ is an anion, representing a chloride ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostannate ion, a chlorosulfonate ion, a fluorosulfonate ion, a trifluoromethanesulfonate ion, a hexanefluoroantimonate ion, a molybdate ion, a tungstate, a titanate ion, a zirconate ion, or the like.

The organic thin film containing such a coloring matter can be formed by any known coating processes, which include, for example, dip coating, spray coating, spin coating, bar coating, roller coating, blade coating and curtain coating. The organic thin layer may have a thickness of from about 500 to 2,000 Å, and preferably about 1,000 Å. Its thickness should be smaller particularly from the viewpoint of recording sensitivity and should be a little larger from the viewpoint of reproduction S/N ratio. Its optimum thickness may differ depending on the type of the coloring matter.

In order to prevent the optical recording layer from being deteriorated because of irradiation with the reproducing light, a stabilizing agent may be mixed with these coloring matters. For example, the stabilizing agent may be selected from those shown below, taking account of its compatibility with the coloring matters and solvents. The stabilizing agent may be added in an amount from several % by weight to 50% by weight based on the weight of the coloring matter. Its addition in an excessively small amount can not have the effect as a stabilizing agent. On the other hand, its addition in an amount more than 50% by weight may bring about a decrease in recording sensitivity because of a decrease in the absolute quantity of a heat-mode recording material. Hence, the agent should preferably be added in an amount of from 10% by weight to 30% by weight based on the weight of the coloring matter. In particular, its addition in an amount of about 20% by weight causes no deterioration of recording sensitivity and has a high effect.

Such a stabilizing agent may include various kinds of metal chelate compounds, in particular, those comprising a multidentate ligand attached to the central metal such as Zn, Cu, Ni, Cr, Co, Mn, Pd or Zr, as exemplified by four-ligand types, i.e., a tetradentate ligand such as $N_4$, $N_2O_2$, $N_2S_2$, $S_4$, $O_2S_2$ and $O_4$, a tridentate ligand such as $N_2O$, $NO_2$, $NS_2$, $O_3$ and NOS with other ligand as exemplified by water, ammonia, halogen, phosphine, amine, arsine or olefin, or two bidentate ligands of $N_2$, NO, $O_2$ or $S_2$, and also bicyclopentadienyl ligands, cyclopentadienyltripyrylium ligands, or any combination of the above, as well as various kinds of aromatic amines or diamines, nitrogen-containing aromatics and onium salts thereof, as exemplified by aminium salts, diimonium salts, pyridinium salts, imidazolinium salts and quinolinium salts. It may also include salts of oxygen-containing aromatics such as pyrylium salts. It is also possible to use a plurality of any of these quenchers in combination, and their compositional ratios can be varied taking account of coating properties of a coloring material composition, stability of coating films, optical characteristics such as reflectance or transmittance, recording sensitivity, etc.

In addition to the coloring matters described above, photochromic materials as typified by a spiropyran type dye represented by the following Formula (XII),

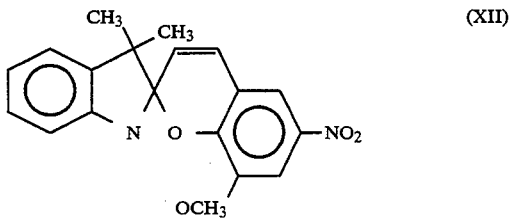

and amorphous magnetooptical recording materials such as Tb-Fe, Gd-Fe, Dy-Fe, Tb-Fe-Co, Gd-Fe-Co and Gd-TbFe can also be used as the material used in the recording layer of the optical recording medium according to the present invention.

Referring now to the adhesive that constitutes the adhesive layer 4, a vast range of materials can be used since the recording layer 3 is covered with the recording auxiliary layer 6 and the recording restraining layer 7 as shown in FIG. 1A. For example, it is possible to use those of a vinyl acetate type, a vinyl acetate acrylic type, a vinyl acetate copolymer type, a vinyl acetate emulsion type, an acrylic type, an acrylate type, an acrylic copolymer type, an ethylene type, an ethylene vinyl acetate type, an ethylene vinyl acetate copolymer type, a polyethylene type, a methylene chloride type, a polyamide type, a polyamide-amine type, a polyimide type, a urea type, an epoxy type, an epoxyurethane type, an epoxyacrylate type, a urethane acrylate type, a polyester type, a chloroprene type, a chloroprene rubber type, a nitrile type, a nitrile rubber type, a urethane type, a vinylurethane type, a polyurethane type, an olefin type, a cyanoacrylate type, an alkyl acrylate type, a vinyl chloride type, a phenol type, an SBR (styrene-butadiene rubber) type, a polyol type, a silica-alumina type, a synthetic rubber type, an emulsion type, an oligoester type, a cellulose type, a formaldehyde type, an ultraviolet-curing type, an organic solvent type, or a styrene-butadiene freon TA type. Those which require energy such as heat, light or electron rays when adhered are also effective so long as such energy does not deteriorate the functions of the optical recording materials.

The method and system for reproducing the recorded data of the optical recording medium according to the present invention will be described below.

Figure 6:
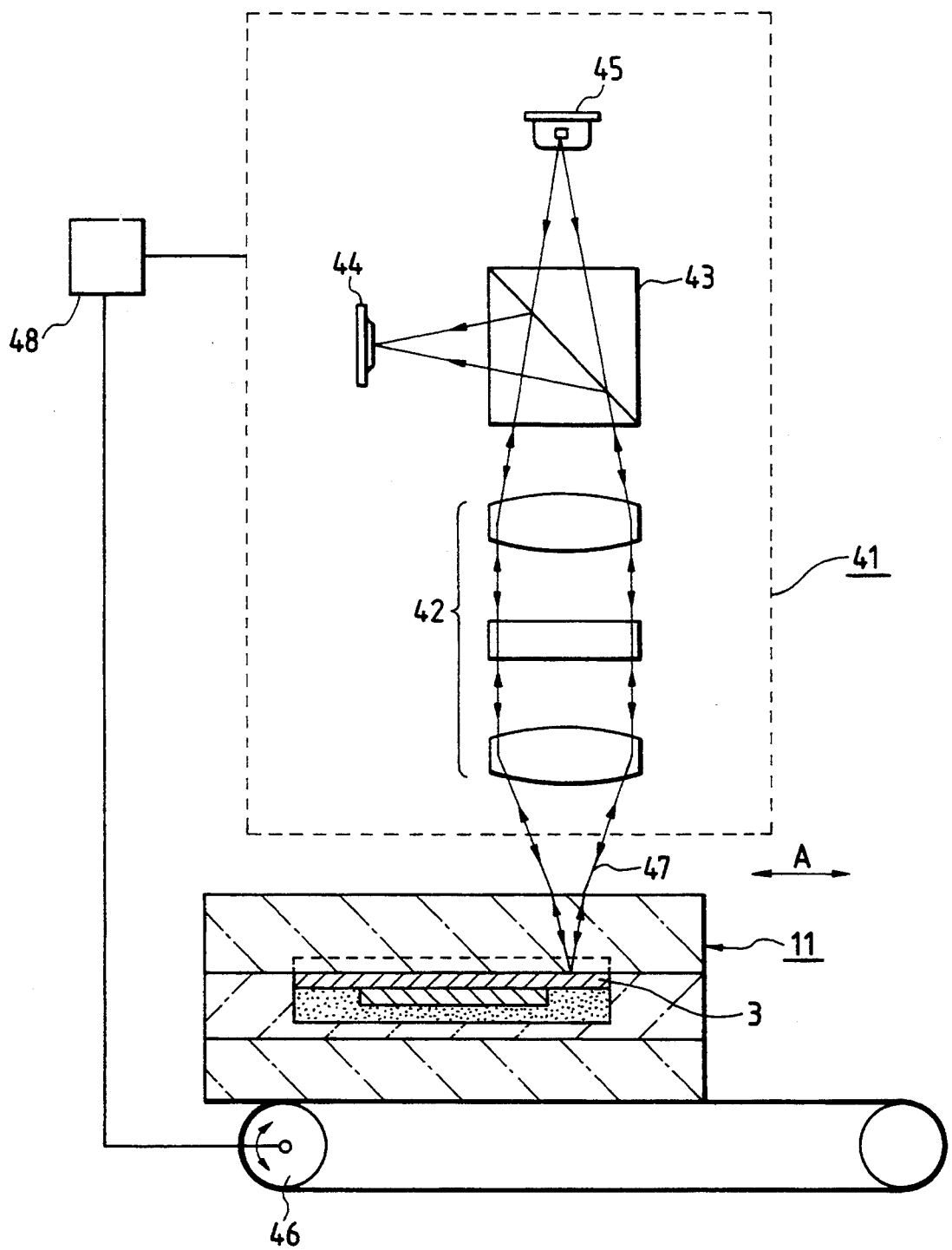
FIG. 6 is a schematic cross section to show a recording-reproducing system for the optical card according to the present invention.

The data recorded in such a state that they are encoded in the information recording tracks within the recording region of the optical recording medium according to the present invention are reproduced by a reproducing system as shown in FIG. 6. More specifically, this system is equipped with a driving means 46 for reciprocating an optical recording medium 11 in the directions of A with respect to reproducing light 47, and an optical head 41 having an optical system that detects reflected light from the optical recording medium and a reproducing light driving system that performs focus servo or radial servo of the reproducing light. The optical recording medium of the present invention is driven in a given direction at a given speed by means of the driving means 46, so that the reproducing light scans or traces an information recording track 33 to reproduce data. Next, after completion of reproduction from one track, the optical head is driven in the direction transversely crossing the track, then the track servo is carried out to allow the reproducing light access to other information recording track, and subsequently the optical recording medium is driven in the direction reverse to the previous direction by means of the above driving system to reproduce data from this track. Slowing down and stopping the movement of the optical recording medium with respect to the reproducing light, accompanying the reversing of the direction of movement of the optical recording medium when the data in the optical recording medium of the present invention is reproduced, should preferably be carried out while the reproducing light stands in the recording layer region 35 other than the recording region. Namely, since this region has been made to have a low sensitivity to the reproducing light, the reproducing light causes no deterioration of the recording layer even if the recording sensitivity of the optical recording medium has relatively increased because of the slowing down and stopping of its movement.

The direction of movement of the optical card of the present invention is reversed, for example, in the following way: The reproducing light is detected to have come into the region 35 by detecting the amount of relative movement of the optical head with respect to the optical card or detecting information pits formed by recording in the information recording track, and then the driving direction of the driving means is reversed by the operation of a control system 48.

The relationship between the optical recording medium of the present invention and the intensity of the reproducing light will be described below. In the optical recording medium of the present invention, the recording restraining layer is provided in the recording layer region 35 other than the recording region to greatly decrease the sensitivity in that region, so that it becomes possible to use reproducing light having a high intensity and hence becomes possible to reproduce signals with a higher S/N ratio.

Figure 7:
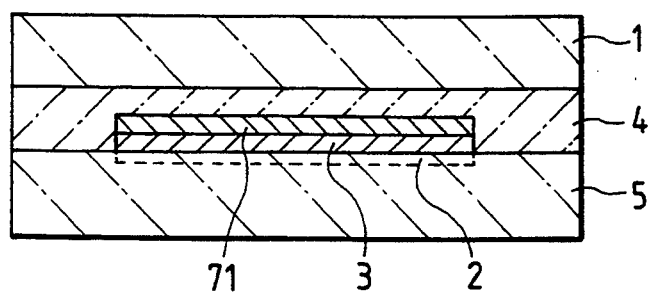
FIG. 7 is a cross section of a conventional optical card improved in recording sensitivity.
Figure 8:
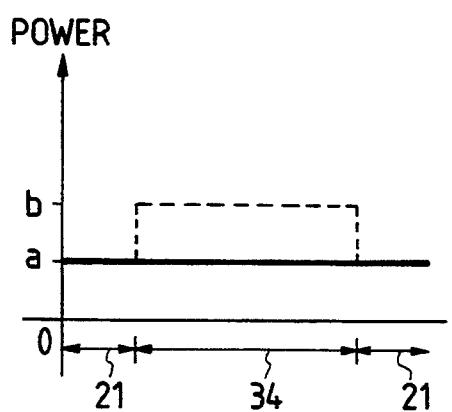
FIG. 8 is a graph to show energy sensitivity at the time when a conventional optical card is driven or stopped.
Figure 9:
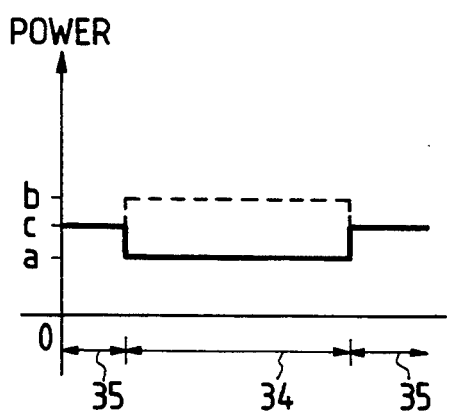
FIG. 9 is a graph to show energy sensitivity at the time when the optical card of the present invention is driven or stopped in an embodiment thereof.
Figure 10:
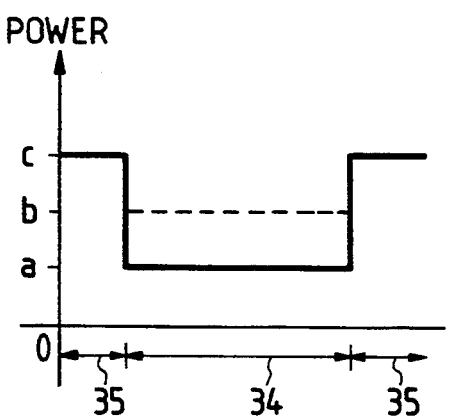
FIG. 10 is a graph to show energy sensitivity at the time when the optical card of the present invention is driven or stopped in another embodiment thereof.

In a conventional optical card made to have a high sensitivity, the optical card, as shown in FIG. 7, comprises an optical recording layer 3 the whole surface of which is covered with a film coating layer 71. FIG. 8 shows the relationship between the position of such an optical card and the energy necessary to cause changes in the recording layer of the optical card at the time it is driven at a recording speed and at the time it is stopped. In FIG. 8, the solid line indicates the amount of energy necessary to cause changes in the recording layer at each position of the recording layer of the optical card at the time the optical card is stopped, and the broken line, the amount of energy (power of a laser beam) necessary to cause changes in the recording layer in the recording region at the time the optical card is driven. As shown in FIG. 8, in the conventional optical card, irradiation with a laser beam having an intensity not lower than b causes a change in the recording layer at the time the card is driven and an energy having an intensity not lower than a causes a change in the recording layer at the time the card is stopped, and hence the data in the optical card must be reproduced using an energy lower than a in order to prevent the change from being caused in the recording layer in the stop-and-reverse region. On the other hand, in the optical card of the present invention, as shown in FIGS. 9 and 10, a laser beam having an intensity not lower than c causes for the first time a change in the recording layer in the recording layer region 35 other than the recording region, and hence as the reproducing laser beam for this optical card a laser beam having a high intensity of from a to less than c (in the case of FIG. 9) or from a to less than b (in the case of FIG. 10) can be used, so that signals with an S/N ratio superior to the conventional case can be reproduced.

In the present invention, what is meant by "no changes is caused in the recording layer" is defined as follows:

I) When stopped:
 The decrease in reflectance of the recording layer is not more than 5% when irradiation with a laser beam is continued for 180 seconds.

II) When driven:
 The decrease in reflectance of the recording layer is not more than 2% when reproduction is repeated on 5,000 passes.

As described above, according to the present invention, information can be recorded even when the optical card is driven at a high speed, since the sensitivity in the recording region is improved. Since also the sensitivity in the recording layer region other than the recording region is lowered by the recording restraining layer, the changes can be prevented from being caused in the recording layer in the stop-and-reverse region of the optical card, which are otherwise caused by the reproducing light at the time of the slowing-down and stopping of the movement of the optical recording medium with respect to the reproducing light, accompanying the reversing of the direction of movement of the optical recording medium. Thus, the reliability of the optical card can be improved without any alteration of the recording-reproducing apparatus.

According to the present invention, since the sensitivity in the recording layer region other than the recording region is lowered, it is also possible to set the intensity of reproducing light higher than that in conventional optical cards, so that signals with a superior S/N ratio can be reproduced.

According to the present invention, since the reflectance does not differ between the recording region and the recording layer region other than the recording region, it is still also possible to prevent the out-of-AT or out-of-AF from occurring.

According to the present invention, since also the recording auxiliary layer can be formed by a conventional printing technique, the recording auxiliary layer can be accurately formed on the recording region of the recording layer. Formation of the recording auxiliary layer by coating also makes it possible to obtain an optical recording medium having a uniform recording sensitivity.

The present invention will be described below in greater detail by giving Examples.

EXAMPLE 1

To a polycarbonate sheet of 0.4 mm in thickness, 85 mm in length and 54 mm in breadth, a stripe-like guide groove pattern with a pitch of 12 $\mu$m, a groove width of 3 $\mu$m and a groove depth of 3,000 Å was heat-transferred (compression process) using a stamper mold to give a transparent substrate 5. On this substrate, a composition prepared by mixing a polymethine dye represented by the following Formula I and a stabilizing agent represented by the following Formula II in the proportion of 3:1 and dissolving the mixture in diacetone alcohol was coated using a gravure roll coater in a coating thickness of about 1,000 Å.

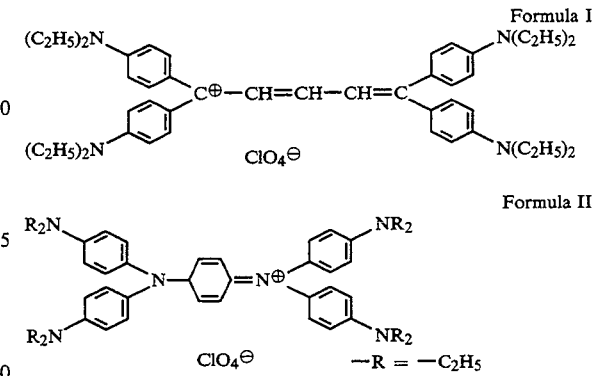

Next, an ultraviolet-curing silicone rubber (trade name: TUV6000; available from Toshiba Silicone Co., Ltd.) was coated using a gravure roll coater in a thickness of about 10 $\mu$m, only on the recording region 34 with an area of 79.6 mm×30 mm of the recording layer, followed by exposure to ultraviolet rays to effect curing to form a recording auxiliary layer 6 with a thermal diffusivity of $4.3 \times 10^{-4}$ cm$^2$/s and a hardness of 25.

Meanwhile, a 1:1 (weight ratio) mixture of an ethylene/vinyl acetate hot-melt adhesive (trade name: EVAFLEX-EV210; available from Mitsui Du Pont K.K.) and alumina beads with a particle diameter of 20 $\mu$m (trade name: CB-A20S; available from Showa Titanium K.K.) was formed into a sheet with a thickness of 50 $\mu$m to produce a hot-melt adhesive sheet serving as both the recording restraining layer and the adhesive layer. Interposing this adhesive sheet, the transparent substrate 5 and a protective substrate (polycarbonate; 0.3 mm thick) was hot-pressed to produce an optical card having a cross section as shown in FIG. 5B, comprising the recording layer covered with the hot-melt adhesive sheet on the regions other than the recording region. The hot-melt adhesive sheet had a thermal diffusivity of $13 \times 10^{-2}$ cm$^2$/s.

To examine the recording sensitivity of this optical card, a laser power at which stable recording became possible in the recording region 34 was measured. Here, the recording was carried out under conditions of a laser beam trace speed of (a) 600 mm/s or (b) 400 mm/s and a spot diameter of 3.0 μm. Results obtained are shown in Table 1.

In the present invention, the "stable recording" refers to an instance in which a recording contrast $[=(R_1-R_2)/R_1$; $R_1$: RF output level in non-recording area, $R_2$: RF output level in recording area] is 0.6 or more.

When the information is reproduced, no recorded information must be destroyed. Now, a reproducing light power limit at which no information was destroyed was examined I) at the time the beam was stopped and II) at the time the beam was being moved (400 mm/s). The terms "no information was destroyed" is defined to mean that I) when stopped, the rate of the decrease in reflectance as a result of continuous irradiation for 180 seconds is 5% or less, and II) when moved, the rate of the decrease in reflectance as a result of repeated reproduction of 5,000 passes is 2% or less that is the terms have the same meaning as "no change was caused in the recording layer".

Figure 11A:
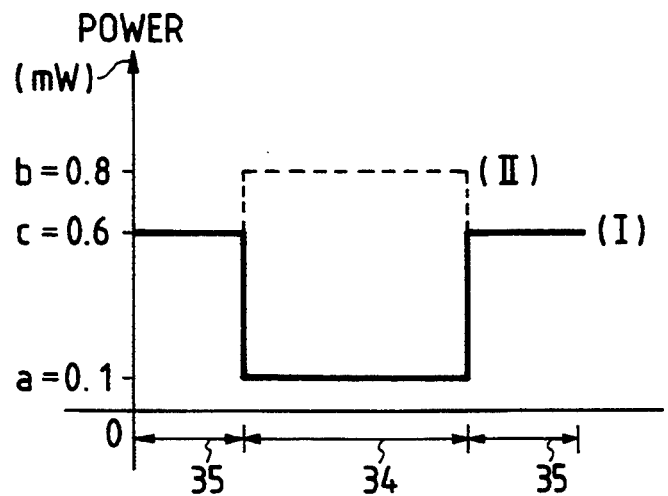

Results obtained are shown in FIG. 11A. As shown therein, in the recording region 34 of the optical card, a laser beam of 0.1 mW causes a change in the recording layer when there is no relative movement between the optical card and the reproducing light [(I): the solid line portion], and a laser beam of 0.8 mW causes a change in the recording layer when there is the relative movement between the optical card and the reproducing light [(II): the dotted line portion]. On the other hand, in the recording layer regions 35 other than the recording region, a laser beam of 0.6 mW causes a change in the recording layer when there is no relative movement between the optical card and the reproducing light.

In the present Example, the optical cards were evaluated using an optical card evaluation apparatus (manufactured by Canon Inc.) equipped with a semiconductor laser having a beam wavelength of 830 nm.

EXAMPLE 2

To a cast sheet (thickness: 0.4 mm) made of polymethyl methacrylate (PMMA), guide grooves with a pitch of 12 μm, a groove width of 3 μm and a groove depth of 3,000 Å were transferred by the 2P process using a photocurable resin (trade name: 30X717; available from Three Bond Co., Ltd.), to give a transparent substrate 5. On this substrate, a recording layer was formed in the same manner as in Example 1. Then a heat-curable silicone rubber (trade name: TSE3033; available from Toshiba Silicone Co., Ltd.) was coated in a thickness of 0.75 μm only on the recording region 34 of the recording layer, followed by curing at 100° C. for 1 hour to form a recording auxiliary layer 6 with a thermal diffusivity of $4.1 \times 10^{-4}$ $cm^2/s$ and a hardness of 30. Next, Al was deposited in a thickness of about 500 Å so as to cover the recording auxiliary layer 6 and the recording layer region other than the recording region, not covered with the recording auxiliary layer 6, to form a recording restraining layer 7 with a thermal diffusivity of $9.4 \times 10^{-1}$ $cm^2/s$. Then, this substrate and a protective substrate (a PMMA cast sheet with a thickness of 0.3 mm) were stuck together using an ultraviolet-curing adhesive (trade name: Three Bond 3000; available from Three Bond Co., Ltd.). Thus an optical card having a cross section as shown in FIG. 1A was prepared.

Figure 11B:
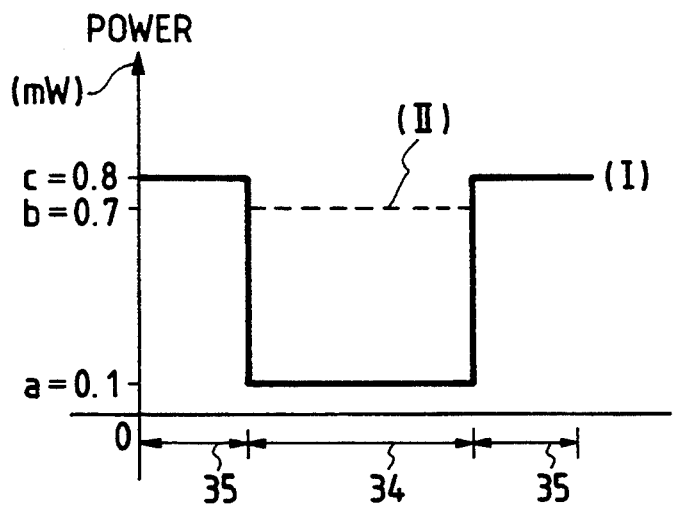

The optical card thus obtained was evaluated in the same manner as in Example 1. Results obtained are shown in Table 1 and FIG. 11B.

COMPARATIVE EXAMPLE 1

A recording layer was formed in the same manner as in Example 1 and thereafter a recording auxiliary layer (trade name: TUV6000; available from Toshiba Silicone Co., Ltd.) was formed in a thickness of about 10 μm using a gravure roll coater, not only on the recording region but also on the stop-and-reverse region, to which a protective substrate was laminated using a hot-melt adhesive (trade name: EVAFLEX EV250; available from Mitsui Du Pont K.K.) to give an optical card.

Figure 12A:
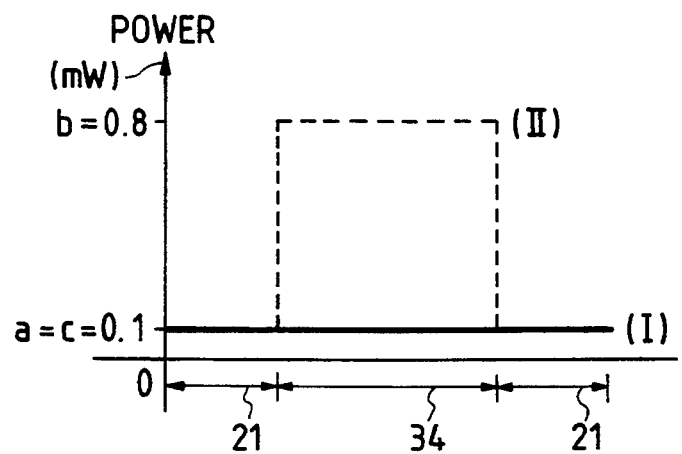

The optical card thus obtained was evaluated in the same manner as in Example 1 to obtain the results as shown in Table 1 and FIG. 12A.

COMPARATIVE EXAMPLE 2

A recording layer (thermal diffusivity: $6.6 \times 10^{-4}$ $cm^2/s$) was formed in the same manner as in Example 1 and thereafter a protective substrate was laminated using a hot-melt adhesive (7580, available from Hirodine Kogyo Co., Ltd.), without forming the recording auxiliary layer and recording restraining layer, to give an optical card.

Figure 12B:
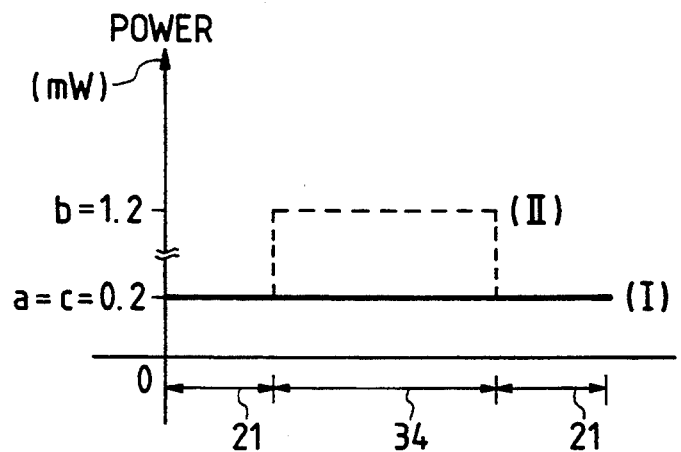

The optical card thus obtained was evaluated in the same manner as in Example 1 to obtain the results as shown in Table 1 and FIG. 12B.

Here, the power used to reproduce information must be within the range in which no recorded information is destroyed, that is, less than the smaller value between b and c in FIGS. 11 and 12. On the other hand, the reproducing power should preferably be as high as possible taking account of reproduction characteristics such as C/N ratio. In Example 1, it was possible to intensify the reproducing light up to 0.6 mW in Example 1, and up to less than 0.7 mW in Example 2.

Using the comparative optical cards, information was repeatedly reproduced 5,000 passes at a reproducing light power of 0.5 mW. As a result, the reflectance in the stop-and-reverse region 21 decreased by about 10%.

TABLE 1

| Moving speed | Recording Sensitivity | | | |
| --- | --- | --- | --- | --- |
| | Example | | Comparative Example | |
| | 1 | 2 | 1 | 2 |
| (a): 60 mm/s | 2.0 mW | 2.5 mW | 2.0 mW | 3.5 mW |
| (b): 400 mm/s | 3.0 mW | 3.5 mW | 3.0 mW | 8.5 mW |

EXAMPLE 3

An optical card was prepared in the same manner as in Example 1 except that the polymethine dye used therein was replaced with a cyanine dye represented by the following structural formula.

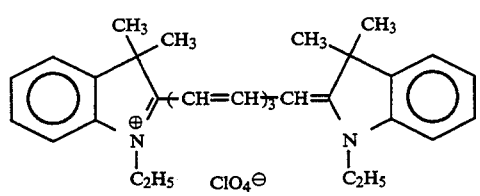

Figure 13A:
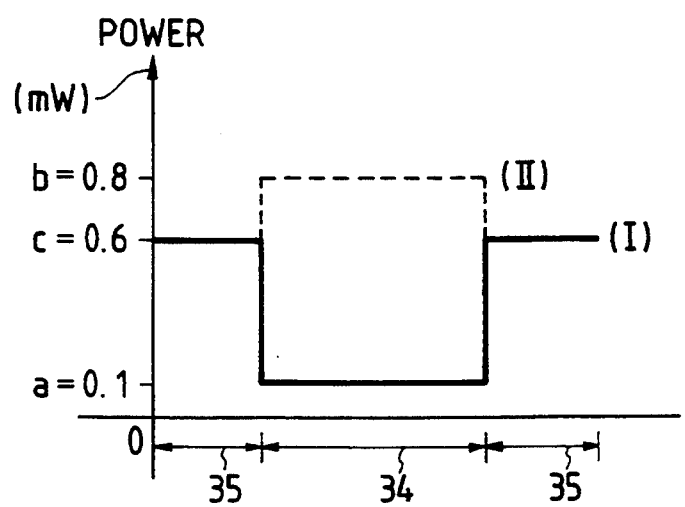

The optical card thus obtained was evaluated in the same manner as in Example 1. Results obtained are shown in Table 2 and FIG. 13A.

COMPARATIVE EXAMPLE 3

Figure 13B:
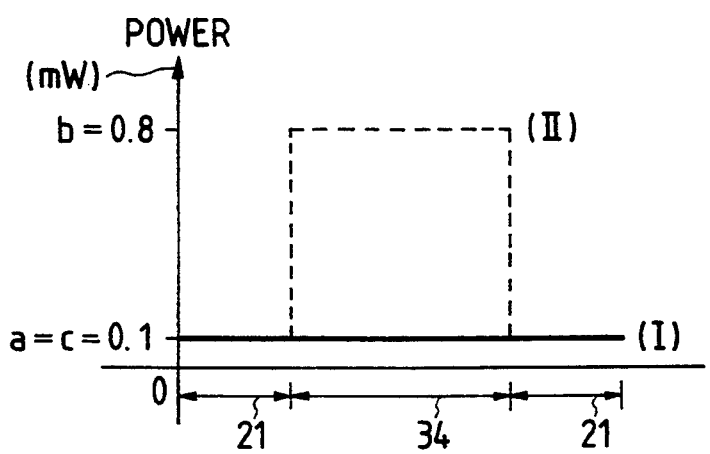

In comparative Example 3, the recording auxiliary layer was formed on the recording region of the recording layer and the stop-and-reverse region, and the protective substrate was laminated thereto using the hot-melt adhesive (trade name: EVAFLEX-EV210; available from Mitsui Du Pont K.K.). An optical card was thus prepared, and was evaluated in the same manner. Results obtained are shown in Table 2 and FIG. 13B.

COMPARATIVE EXAMPLE 4

Figure 13C:
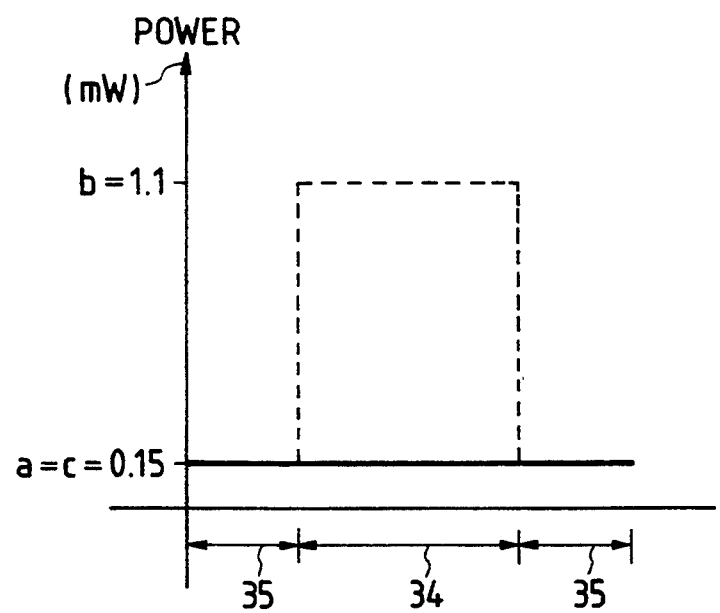

In comparative Example 3, the recording auxiliary layer was not formed and the protective substrate was directly laminated to the recording layer using the hot-melt adhesive sheet. An optical card was thus prepared, and was evaluated in the same manner. Results obtained are shown in Table 2 and FIG. 13C.

TABLE 2

| Moving speed | Recording Sensitivity | | |
|---|---|---|---|
| | | Comparative Example | |
| | Example 3 | 3 | 4 |
| (a): | 2.2 mW | 2.2 mW | 3.3 mW |
| (b): | 5.5 mW | 5.5 mW | 7.6 mW |

EXAMPLE 4

An optical card was prepared in the same manner as in Example 2 except that as the recording auxiliary layer formed therein the silicone rubber was replaced with a 5 μm thick polyethylene terephthalate film, which was laminated onto the recording region of the recording layer without any adhesive, and as the recording restraining layer the Al was replaced with $Si_3N_4$ formed into a layer in a thickness of 1 μm, having a thermal diffusivity of $7.29 \times 10^{-2}$ cm$^2$/S. As a result, the laser beam energy necessary to carry out recording in the recording region in a recording contrast of not less than 0.6 was 1.8 mW when the optical card was moved at a speed of 60 mm/sec, and 3.0 mW when moved at a speed of 400 mm/sec.

On the other hand, in the state the optical card was stopped, the intensity of reproducing light necessary to cause changes in the recording layer in its recording region and its region other than the recording region was 0.06 mW or 0.7 mW, respectively. The intensity of reproducing light necessary to cause changes in the recording layer corresponding to the recording region when the reproducing light was moved at a speed of 400 mm/s with respect to the optical card was 0.5 mW. As a result, it was possible to increase the intensity of the reproducing light on this optical card, up to not less than 0.06 mW and less than 0.5 mW.

REFERENCE EXAMPLE 1

Using a polycarbonate sheet of 85 mm in length, 54 mm in breadth and 0.4 mm in thickness as the transparent substrate 5, stripe-like guide grooves with a groove width of 3 μm and a pitch of 12 μm were formed by heat-transfer using a stamper, and a diacetone alcohol solution of a 3:1 mixture of a polymethine dye represented by the following structural formula I and a stabilizing agent represented by the following structural formula IV was coated thereon using a gravure roll coater in a thickness of about 1,000 Å.

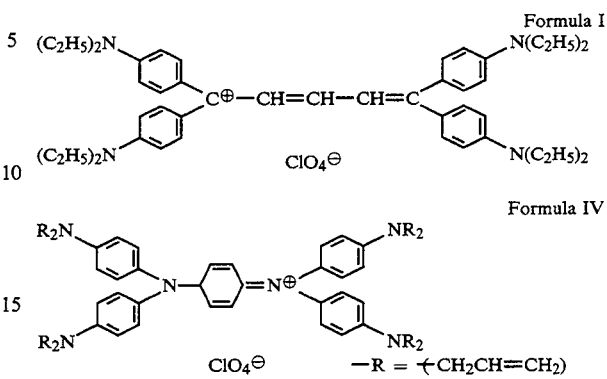

Only on the recording region 34 of the recording layer thus formed, an ultraviolet-curing silicone rubber (trade name: TUV6000; available from Toshiba Silicone Co., Ltd.) was coated using a gravure roll coater in a thickness of about 10 μm, followed by exposure to ultraviolet rays to effect curing to form a recording auxiliary layer.

On the transparent substrate thus obtained, an ethylene/vinyl acetate hot-melt adhesive (trade name: EVAFLEX-EV150; available from Mitsui Du Pont Chemical) with a thermal diffusivity of $4 \times 10^{-4}$ cm$^2$/s was coated using a bar coater in a thickness of about 50 μm, which was then hot-pressed together with a 0.3 mm thick polycarbonate protective substrate to give an optical card having a cross section as shown in FIG. 14.

To examine the recording sensitivity of this optical card, data were recorded under conditions of the following three modes as shown in the following Table 3, at a laser power of 3.5 mW and in a spot diameter of 3.0 μm, and the recording contrast (the proportion of decrease in the RF output level in the recording area to that in the non-recording area) was measured. Results obtained are shown in Table 4.

TABLE 3

| Condition | Card moving speed | Recording pulse width |
|---|---|---|
| 1 | 60 mm/sec | 60 μsec |
| 2 | 400 mm/sec | 9 μsec |
| 3 | 720 mm/sec | 5 μsec |

As a standard to estimate the liability to deterioration of the optical recording layer in its region other than the recording region in the state the card was stopped, measured was the time by which the reflectance decreased by 5% of the initial value (reproducing light deterioration time) when the same position as the recording region 35 was continuously irradiated with a laser beam under the same conditions as the laser beam used for reproduction (laser power: 0.2 mW; spot diameter: 3.0 μm). Results obtained are shown in Table 5.

REFERENCE EXAMPLE 2

A PMMA cast sheet of 85 mm in length, 54 mm in breadth and 0.4 mm in thickness, having been provided with Guide grooves, was used as the transparent substrate 5. On this substrate, the recording layer as shown in Reference Example 1 was formed. On the recording region of this recording layer, a heat-curable silicone rubber (trade name: TSE3033; available from Toshiba Silicone Co., Ltd.) was coated using a bar coater in a thickness of about 10 μm, followed by heating at 80° C. for 2 hours to effect curing to form a recording auxiliary layer in such a way that the recording auxiliary layer came into contact only with the recording region. The resulting substrate and a 0.3 mm thick PMMA protective substrate were hot-pressed via a polyester type adhesive sheet (trade name: CHEMIT R-99HV; available from Toray Industries, Inc.) with a thermal diffusivity of $8.1 \times 10^{-4}$ cm$^2$/s. An optical card was thus obtained.

The recording sensitivity and reproducing light deterioration time of this optical card was measured in the same manner as in Reference Example 1. Results obtained are shown in Tables 4 and 5.

REFERENCE EXAMPLE 3

On an extruded polycarbonate plate (85 mm in length, 54 mm in breadth and 0.4 mm in thickness), stripe-like guide grooves with a groove width of 3 μm and a pitch of 12 μm were formed by transfer using photocurable resin (trade name: INC118; available from Nippon Kayaku Co., Ltd.), to give a transparent substrate 5. On this substrate, an optical recording layer was provided in the same manner as in Reference Example 1. Thereafter an ethylene/vinyl acetate hot-melt adhesive sheet (trade name: HIRODINE 7580; available from Hirodine Kogyo Co., Ltd.; thickness: 50 μm) was provisionally fitted so as to cover the area other than the recording region. Then, on one side of a 0.3 mm thick protective substrate made of polycarbonate, an ultraviolet-curing silicone rubber (trade name: TUV6000; available from Toshiba Silicone Co., Ltd.) was coated in a thickness of 50 μm over a little larger area than the recording region, followed by exposure to ultraviolet rays to form a film. These transparent substrate and protective substrate were bonded by hot-lamination to give an optical card as shown in FIG. 15.

The properties of the optical card thus obtained were evaluated in the same manner as in Reference Example 1. Results obtained are shown in Tables 4 and 5.

COMPARATIVE EXAMPLE 5

An optical recording layer was formed in the same manner as in Reference Example 1. Thereafter, on the whole area of the recording layer, a recording auxiliary layer (using TUV6000; available from Toshiba Silicone Co., Ltd.; thickness: 10 μm) was formed in the same manner as in Reference Example 1. Thus an optical card as shown in FIG. 7 was prepared.

The optical card thus obtained was evaluated in the same manner as in Reference Example 1. Results obtained are shown in Tables 4 and 5. As shown in the tables, the card had the same recording sensitivity as in Reference Example 1, but the reproducing light deterioration time was extremely short, resulting in a rapid progress of deterioration of the recording layer in its stop-and-reverse region.

COMPARATIVE EXAMPLE 6

A recording layer was formed in the same manner as in Reference Example 1. Thereafter, without providing any recording auxiliary layer, a layer of an ethylene/vinyl acetate hot-melt adhesive (trade name: EVAFLEX-150; available from Mitsui Du Pont Chemical) was formed on the recording layer in a thickness of about 50 μm, and a 0.3 mm thick polycarbonate protective substrate was hot-laminated thereto to give an optical card.

The optical card thus obtained was evaluated in the same manner as in Reference Example 1. Results obtained are shown in Tables 4 and 5.

TABLE 4

| Recording Contrast under Various Recording Conditions | | | |
|---|---|---|---|
| | Conditions | | |
| | 1 | 2 | 3 |
| Reference Example: | | | |
| 1 | 0.78 | 0.77 | 0.73 |
| 2 | 0.75 | 0.72 | 0.70 |
| 3 | 0.75 | 0.74 | 0.71 |
| Comparative Example: | | | |
| 5 | 0.78 | 0.77 | 0.73 |
| 6 | 0.60 | 0.24 | 0.19 |

TABLE 5

| | Reproducing light deterioration time |
|---|---|
| Reference Example: | |
| 1 | 148 seconds |
| 2 | 164 seconds |
| 3 | 154 seconds |
| Comparative Example: | |
| 5 | 27 seconds |
| 6 | 150 seconds |

What is claimed is:

1. An optical recording medium, for use with a playback focused beam of light of a given frequency and a predetermined intensity, said optical recording medium comprising:
   a substrate having a track on its surface,
   a recording layer provided on the surface of said substrate,
   a recording auxiliary layer that covers a recording region of said recording layer on its surface on the side not facing the substrate, and
   a recording restraining layer that covers the recording layer on its surface not covered with said recording auxiliary layer,
   said recording restraining layer providing an efficient heat sink to said recording layer, whereby a sensitivity of said recording layer covered by said recording restraining layer in a state in which movement between said optical recording medium and said beam has stopped is lower than a sensitivity of said recording layer within the recording region in a state of movement between said optical recording medium and said beam.

2. The optical recording medium according to claim 1, wherein said recording auxiliary layer comprises a polymeric compound having a rubber elasticity.

3. The optical recording medium according to claim 2, wherein said recording auxiliary layer has a hardness of from 2 to 70.

4. The optical recording medium according to claim 1, wherein said recording auxiliary layer has a thermal diffusivity of not more than $1 \times 10^{-3}$ cm$^2$/s.

5. The optical recording medium according to claim 4, wherein said recording auxiliary layer has a thermal diffusivity of from $1 \times 10^{-4}$ cm$^2$/s to $1 \times 10^{-3}$ cm$^2$/s.

6. The optical recording medium according to claim 1, wherein said recording restraining layer has a thermal diffusivity of more than $1 \times 10^{-3}$ cm$^2$/s.

7. The optical recording medium according to claim 6, wherein said recording restraining layer has a thermal diffusivity of from $1 \times 10^{-2}$ cm$^2$/s to 2 cm$^2$/s.

8. The optical recording medium according to claim 6, wherein said recording restraining layer comprises an adhesive in which at least one of a metal and an inorganic dielectric has been dispersed.

9. The optical recording medium according to claim 6, wherein said recording restraining layer comprises at least one of a metal and an inorganic dielectric.

10. The optical recording medium according to claim 1, wherein said recording auxiliary layer has a hardness of from 2 to 70 and a thermal diffusivity of not more than $1 \times 10^{-3}$ cm$^2$/s.

11. The optical recording medium according to claim 10, wherein said recording auxiliary layer comprises a polymeric compound selected from the group consisting of silicone rubber, urethane rubber, styrene rubber and butadiene rubber.

12. The optical recording medium according to claim 1, wherein said recording auxiliary layer is laminated onto the recording region of said recording layer without interposing an adhesive layer between them.

13. The optical recording medium according to claim 1, wherein said optical recording medium is an optical card.

14. An optical recording medium comprising:
a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its region other than the recording region;
said optical recording medium being subjected to reciprocating movement relative to recording and/or reproducing light to carry out recording and/or reproducing a datum;
said region other than the recording region of the recording layer in said medium being a region for tracking servo, track access, and auto-focusing, and a region irradiated with reproducing light when the direction of movement of said medium is reversed; and
said recording restraining layer providing an efficient heat sink to said recording layer, whereby a sensitivity of said recording layer covered by said recording restraining layer in a state in which movement between said optical recording medium and said beam has stopped is lower than a sensitivity of said recording layer within the recording region in a state of movement between said optical recording medium and said beam.

15. The optical recording medium according to claim 14, wherein said optical recording medium is an optical card.

16. A method of reproducing recorded data of an optical recording medium by using a playback focused beam of light having a given frequency and a predetermined intensity, comprising:
providing an optical recording medium comprising
a substrate having a track in a stripe on its surface, and, provided on the surface of said substrate, a recording layer, a recording auxiliary layer that covers a recording region of said recording layer on its surface on the side not facing the substrate, and a recording restraining layer that covers the recording layer on its region other than the recording region,
said recording restraining layer providing an efficient heat sink to said recording layer, whereby a sensitivity of said recording layer covered by said recording restraining layer in a state in which movement between said optical recording medium and said beam has stopped is lower than a sensitivity of said recording layer within the recording region in a state of movement between said optical recording medium and said beam; and an encoded datum being recorded in the recording layer in the recording region; and
subjecting said optical recording medium to reciprocating movement in the direction parallel to said track so that said beam traces said track, during the step of which the movement direction of said optical recording medium is reversed when said region other than the recording region of said recording layer is irradiated with said beam.

17. The method according to claim 16, wherein said optical recording medium is an optical card.

18. An optical recording medium, for use with a playback focused beam of light having a given frequency and a predetermined intensity, said optical recording medium comprising:
a substrate having a track on its surface; and
a recording layer provided on the surface of said substrate;
said recording layer having (i) a recording region and (ii) a low-sensitivity region covered by a recording restraining layer, said recording restraining layer providing an efficient heat sink to said recording layer, whereby a sensitivity of said recording layer within the low-sensitivity region in a state in which movement between said optical recording medium and said beam has stopped is lower than a sensitivity of said recording layer within the recording region in a state of movement between said optical recording medium and said beam.

* * * * *

UNITED STATES PATENT AND TRADEMARK OFFICE
CERTIFICATE OF CORRECTION

PATENT NO. : 5,432,770
DATED : July 11, 1995
INVENTOR(S) : MASATAKA YASHIMA, et al.

It is certified that error appears in the above-indentified patent and that said Letters Patent is hereby corrected as shown below:

ON THE COVER PAGE

[57] ABSTRACT

Line 5, "the covers" should read --covers--.

COLUMN 1

Line 20, "Recent" should read --In recent--.
    Line 44, "research" should read --research in--.
    Line 45, "productions" should read --production--.

COLUMN 2

Line 33, "an other" should read --another--.

COLUMN 5

Line 28, "as for," should read --that--; and
    Line 29, "to trace" should read --traces--.

UNITED STATES PATENT AND TRADEMARK OFFICE
CERTIFICATE OF CORRECTION

PATENT NO. : 5,432,770   Page 2 of 5
DATED : July 11, 1995
INVENTOR(S) : MASATAKA YASHIMA, et al.

It is certified that error appears in the above-indentified patent and that said Letters Patent is hereby corrected as shown below:

COLUMN 6

Line 28, "comprising;" should read --comprising:--.
Line 56, "DRAWING" should read --DRAWINGS--.

COLUMN 8

Line 13, "have" should read --has--.

COLUMN 12

Line 19, "C," should be deleted.

UNITED STATES PATENT AND TRADEMARK OFFICE
CERTIFICATE OF CORRECTION

PATENT NO.  : 5,432,770          Page 3 of 5
DATED       : July 11, 1995
INVENTOR(S) : MASATAKA YASHIMA, et al.

It is certified that error appears in the above-indentified patent and that said Letters Patent is hereby corrected as shown below:

COLUMN 14

Line 26, insert --(2)--.
Lines 29 through 39,

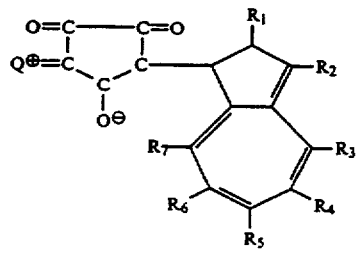

should read

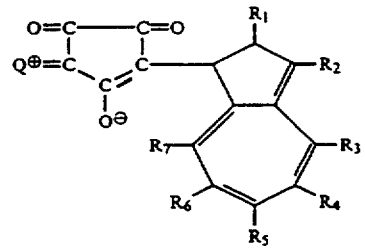

UNITED STATES PATENT AND TRADEMARK OFFICE
CERTIFICATE OF CORRECTION

PATENT NO. : 5,432,770             Page 4 of 5
DATED      : July 11, 1995
INVENTOR(S): MASATAKA YASHIMA, et al.

It is certified that error appears in the above-indentified patent and that said Letters Patent is hereby corrected as shown below:

COLUMN 17

Line 11, "n-buryl" should read --n-butyl--.
Line 12, "sac-buryl" should read --sec-butyl-- and "t-buryl" should read --t-butyl--.
Line 26, "butanyl" should read --butenyl-- and "pentanyl" should read --pentenyl--.
Line 27, "haptanyl" should read --heptenyl--.

COLUMN 19

Line 9, "ethyl" should read --ethyl,--.
Line 49, "ni trophenyl" should read --nitrophenyl--.
Line 67, "naththoxazole" should read --naphthoxazole--.

COLUMN 23

Line 31, "changes" should read --change--.

COLUMN 24

Line 65, "13" should read --1.3--.

COLUMN 25

Line 20, "less" should read --less,--.
Line 21, "is" should read --is,--.

UNITED STATES PATENT AND TRADEMARK OFFICE
CERTIFICATE OF CORRECTION

PATENT NO. : 5,432,770
DATED : July 11, 1995
INVENTOR(S) : MASATAKA YASHIMA, et al.

It is certified that error appears in the above-indentified patent and that said Letters Patent is hereby corrected as shown below:

<u>COLUMN 27</u>

Line 16, "Example 3," should read --Example 4,--.

<u>COLUMN 28</u>

Figure 14A:
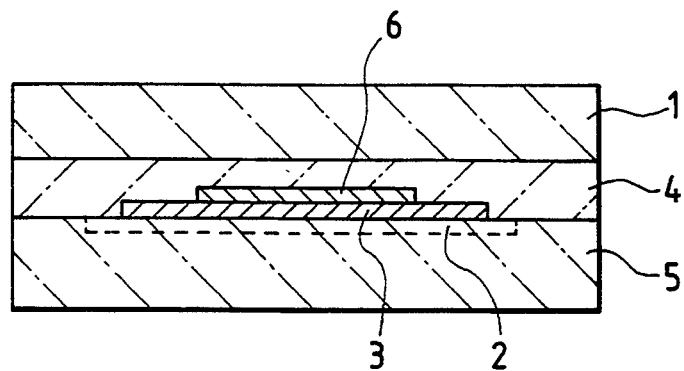

Line 34, "FIG. 14" should read --FIG. 14A--.
Line 64, "Guide" should read --guide--.

<u>COLUMN 29</u>

Figure 14B:
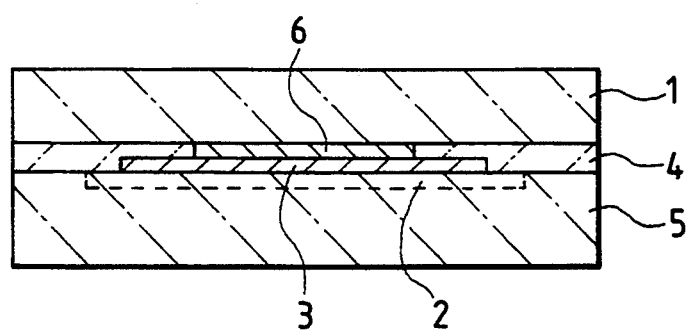

Line 38, "FIG. 15" should read --FIG. 14B--.

Signed and Sealed this

Ninth Day of January, 1996

Attest:

BRUCE LEHMAN

*Attesting Officer*     *Commissioner of Patents and Trademarks*